United States Patent
Hagiwara et al.

(10) Patent No.: US 10,087,807 B2
(45) Date of Patent: Oct. 2, 2018

(54) DETERIORATION DIAGNOSIS APPARATUS FOR EXHAUST GAS PURIFICATION APPARATUS

(71) Applicant: TOYOTA JIDOSHA KABUSHIKI KAISHA, Toyota-shi, Aichi-ken (JP)

(72) Inventors: Koji Hagiwara, Susono (JP); Toru Kidokoro, Hadano (JP); Yasushi Iwazaki, Ebina (JP); Hirotaka Saitoh, Shizuoka-ken (JP); Yuji Miyoshi, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 86 days.

(21) Appl. No.: 15/200,327

(22) Filed: Jul. 1, 2016

(65) Prior Publication Data
US 2017/0009626 A1    Jan. 12, 2017

(30) Foreign Application Priority Data

Jul. 6, 2015    (JP) ................. 2015-135615

(51) Int. Cl.
*F01N 3/08*    (2006.01)
*F01N 3/20*    (2006.01)
(Continued)

(52) U.S. Cl.
CPC ........... *F01N 3/208* (2013.01); *F01N 3/0814* (2013.01); *F01N 3/0842* (2013.01);
(Continued)

(58) Field of Classification Search
CPC .... F01N 11/007; F01N 3/0814; F01N 3/0842; F01N 3/0864; F01N 3/0885;
(Continued)

(56) References Cited

U.S. PATENT DOCUMENTS

2010/0199636 A1    8/2010    Goya et al.
2010/0254862 A1    10/2010    Sato et al.
(Continued)

FOREIGN PATENT DOCUMENTS

EP    1630131 A1    3/2006
EP    2175969 A2    4/2010
(Continued)

OTHER PUBLICATIONS

United Sates Patent and Trademark Office, Notice of Allowance dated May 2, 2018 in U.S. Appl. No. 15/375,800, 10 pages.

*Primary Examiner* — Brandon Lee
(74) *Attorney, Agent, or Firm* — Hunton Andrews Kurth LLP

(57) ABSTRACT

A deterioration diagnosis apparatus for an exhaust gas purification apparatus according to the invention performs an induction process when an internal combustion engine is operating at a lean air-fuel ratio, measures the air-fuel ratio of the exhaust gas flowing into the SCR catalyst and the air-fuel ratio of the exhaust gas flowing out of the SCR catalyst by the air-fuel ratio sensor during the period through which the induction process is performed, and diagnoses deterioration of the SCR catalyst based on the difference between the air-fuel ratios thus measured. The diagnosis apparatus adjusts the quantity of reducing agent supplied to a hydrogen production catalyst during the period through which the induction process is performed, taking account of the degree of deterioration of the hydrogen production catalyst.

7 Claims, 13 Drawing Sheets

(51) Int. Cl.
*F02D 41/02* (2006.01)
*F01N 11/00* (2006.01)
*F02D 41/14* (2006.01)
*F02D 41/32* (2006.01)
*F02D 41/40* (2006.01)
*F02D 41/00* (2006.01)

(52) U.S. Cl.
CPC ......... *F01N 3/0864* (2013.01); *F01N 3/0885* (2013.01); *F01N 3/2066* (2013.01); *F01N 3/2073* (2013.01); *F01N 11/007* (2013.01); *F02D 41/0235* (2013.01); *F02D 41/0295* (2013.01); *F02D 41/1441* (2013.01); *F02D 41/1456* (2013.01); *F01N 2550/02* (2013.01); *F01N 2550/03* (2013.01); *F01N 2560/025* (2013.01); *F01N 2900/0418* (2013.01); *F01N 2900/08* (2013.01); *F01N 2900/1624* (2013.01); *F01N 2900/1806* (2013.01); *F02D 41/0002* (2013.01); *F02D 41/1454* (2013.01); *F02D 41/32* (2013.01); *F02D 41/405* (2013.01); *F02D 2200/0614* (2013.01); *F02D 2200/08* (2013.01); *F02D 2200/0816* (2013.01); *Y02T 10/24* (2013.01); *Y02T 10/47* (2013.01)

(58) Field of Classification Search
CPC ...... F01N 3/2066; F01N 3/2073; F01N 3/208; F01N 2550/02; F01N 2550/03; F01N 2560/025; F01N 2900/0418; F01N 2900/08; F01N 2900/1624; F01N 2900/1806; F02D 41/0235; F02D 41/0295; F02D 41/1441; F02D 41/1456; F02D 2200/0614; F02D 2200/08; F02D 2200/0816; F02D 41/0002; F02D 41/1454; F02D 41/32; F02D 41/405; Y02T 10/24; Y02T 10/47

See application file for complete search history.

(56) References Cited

U.S. PATENT DOCUMENTS

| | | |
|---|---|---|
| 2012/0291721 A1 | 11/2012 | Pursifull et al. |
| 2017/0167352 A1 | 6/2017 | Hagiwara et al. |

FOREIGN PATENT DOCUMENTS

| | | |
|---|---|---|
| JP | 2000018022 A | 1/2000 |
| JP | 2000350934 A | 12/2000 |
| JP | 2004-285840 A | 10/2004 |
| JP | 2008-128213 A | 6/2008 |
| JP | 2009106913 A | 5/2009 |
| JP | 2010065602 A | 3/2010 |
| JP | 2010236458 A | 10/2010 |
| JP | 2012-241652 A | 12/2012 |
| JP | 2016-008510 A | 1/2016 |
| WO | 2009013610 A2 | 1/2009 |
| WO | 2015/194155 A1 | 12/2015 |

[Fig. 2]
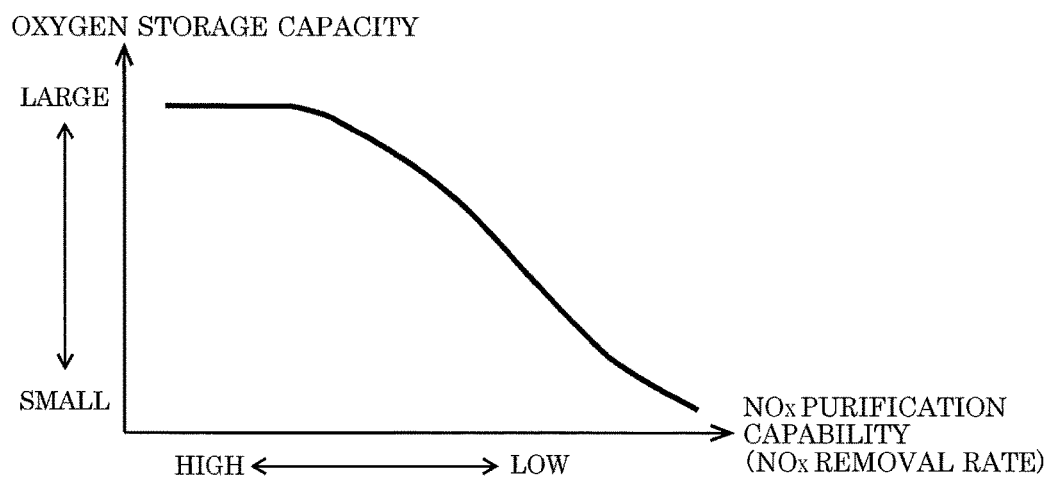

[Fig. 3]
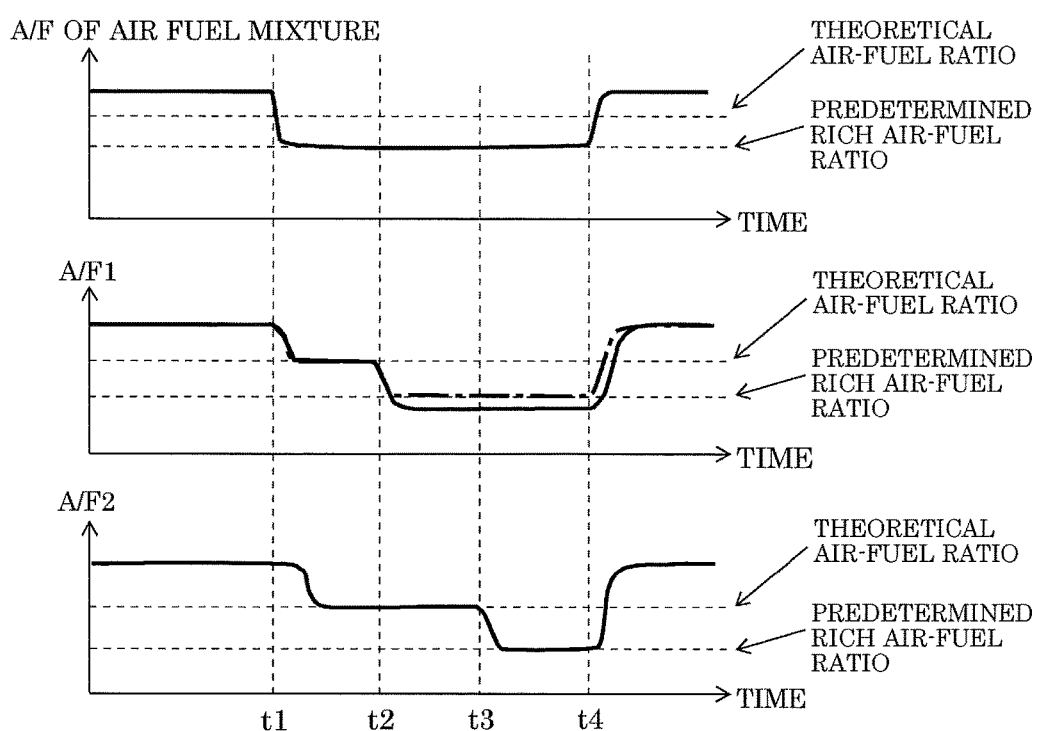

[Fig. 4]
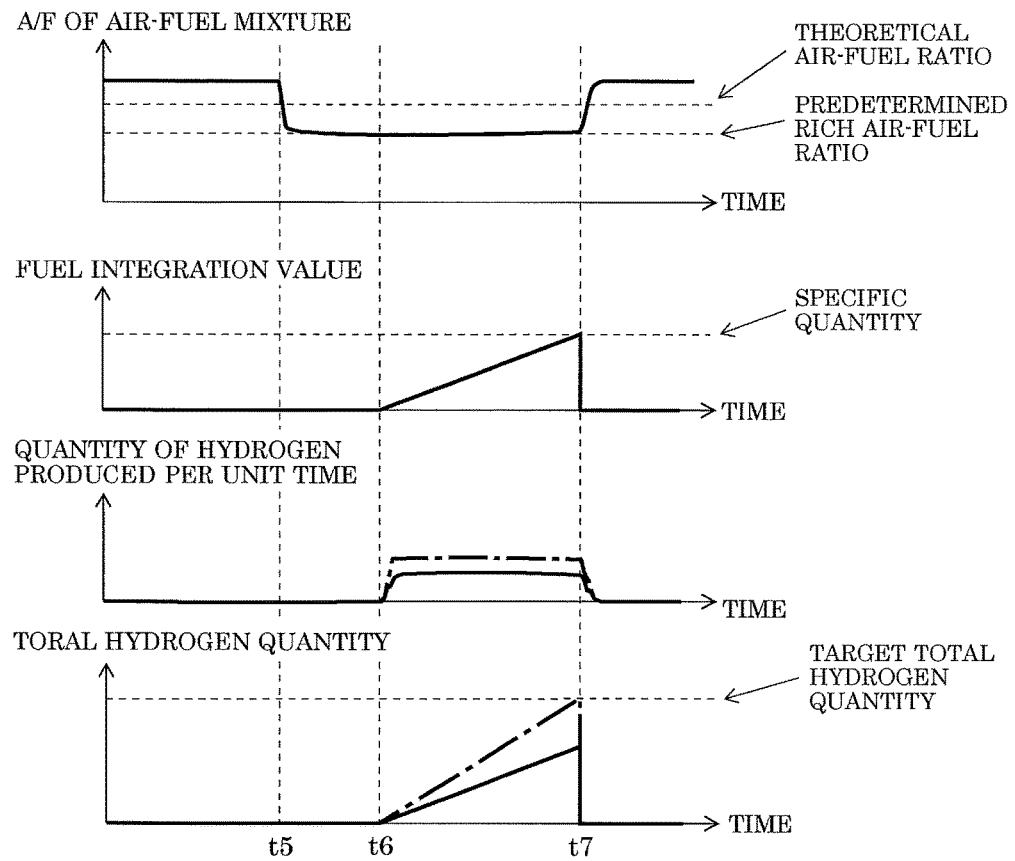

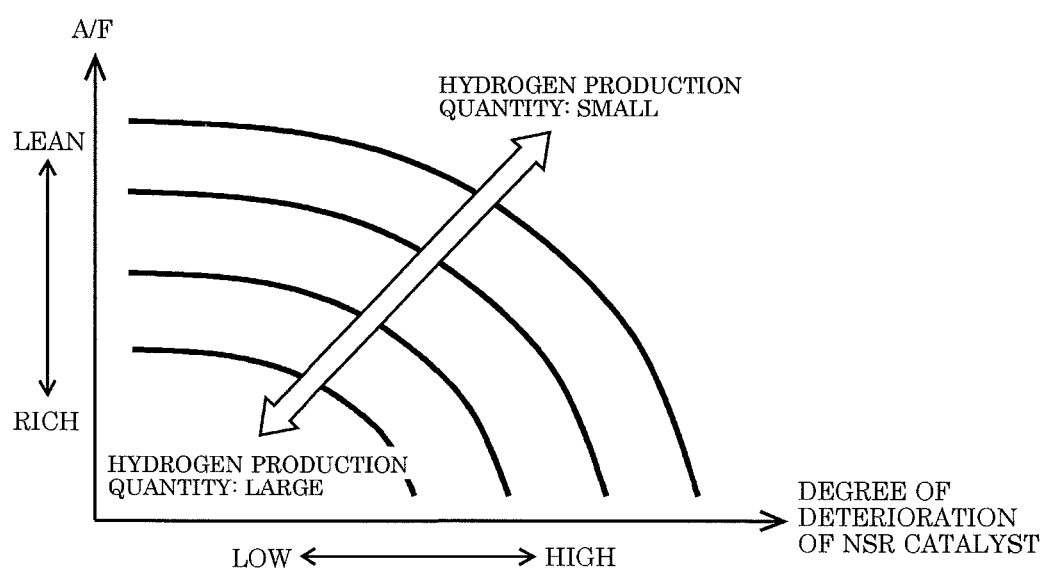
[Fig. 5]

[Fig. 6]
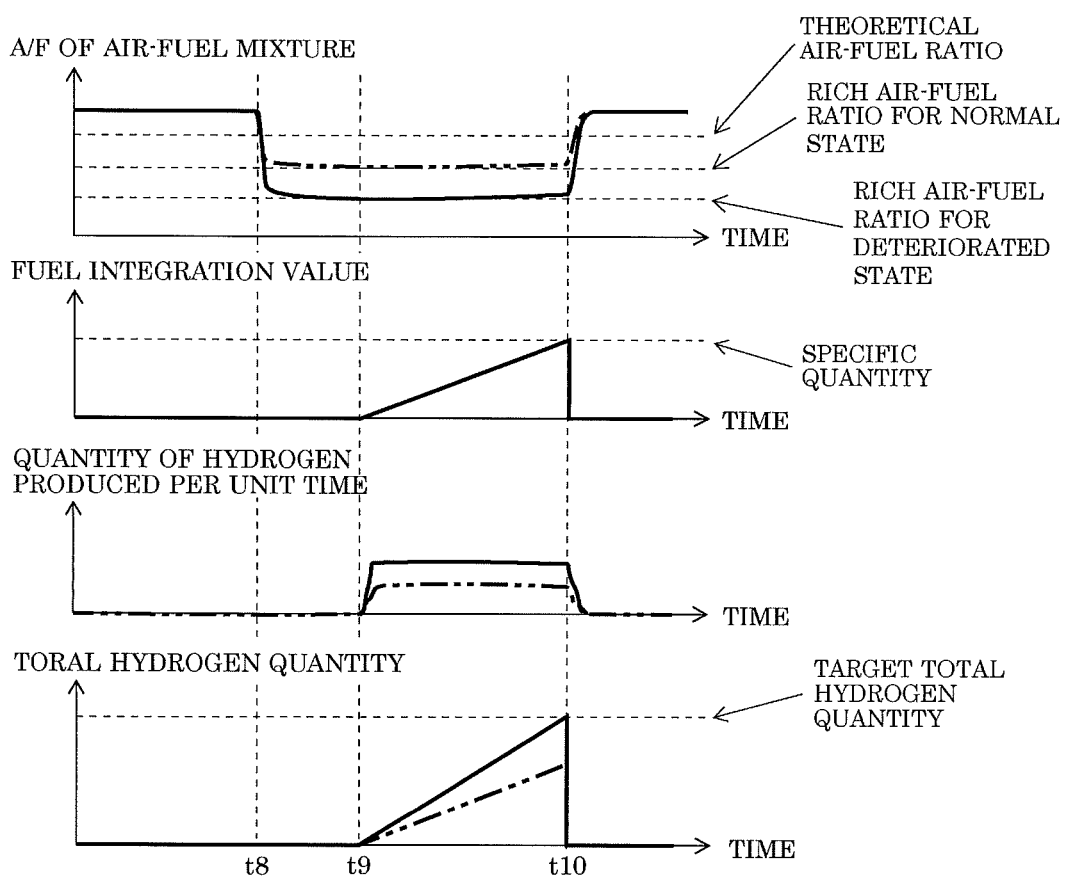

[Fig. 7]
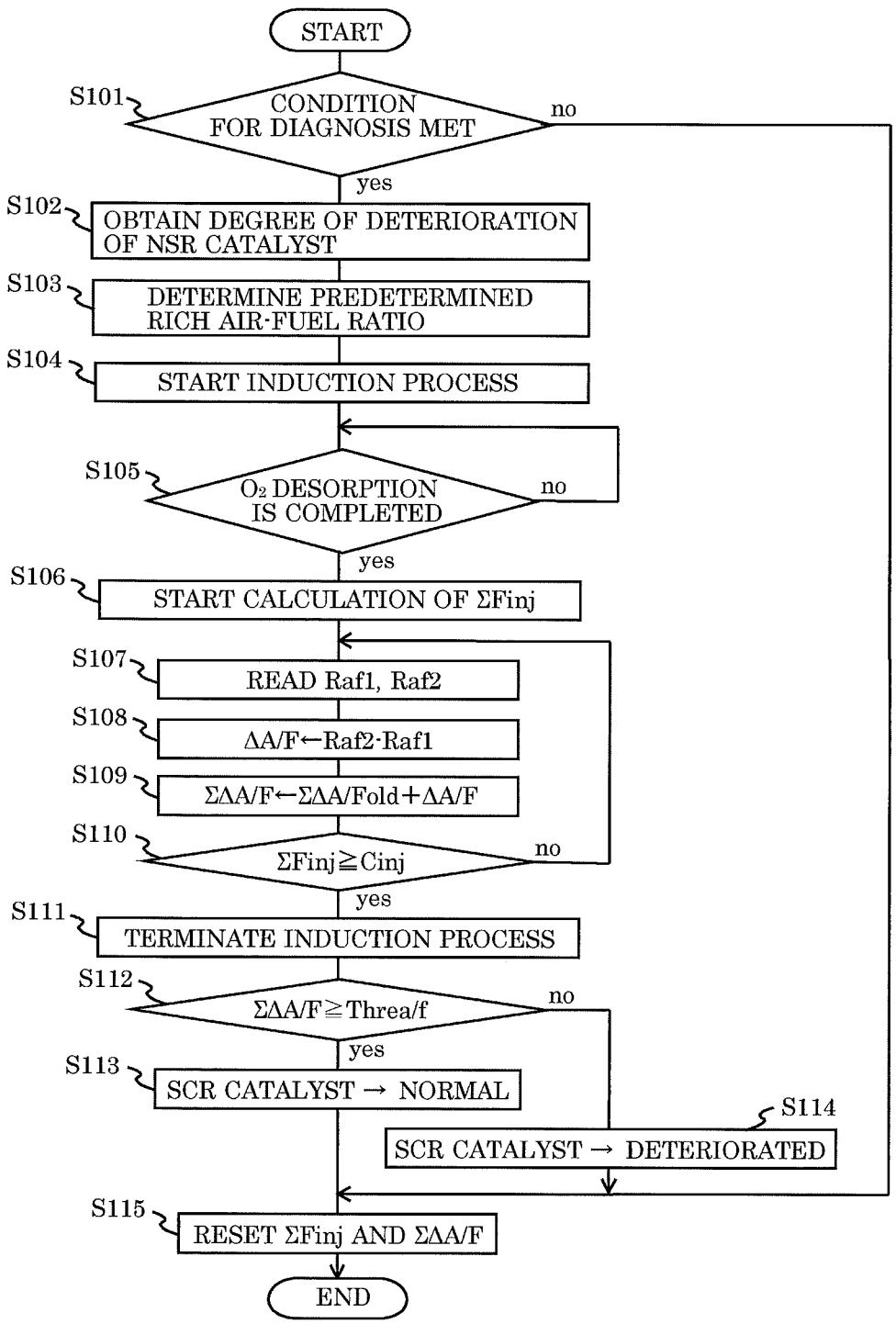

[Fig. 8]
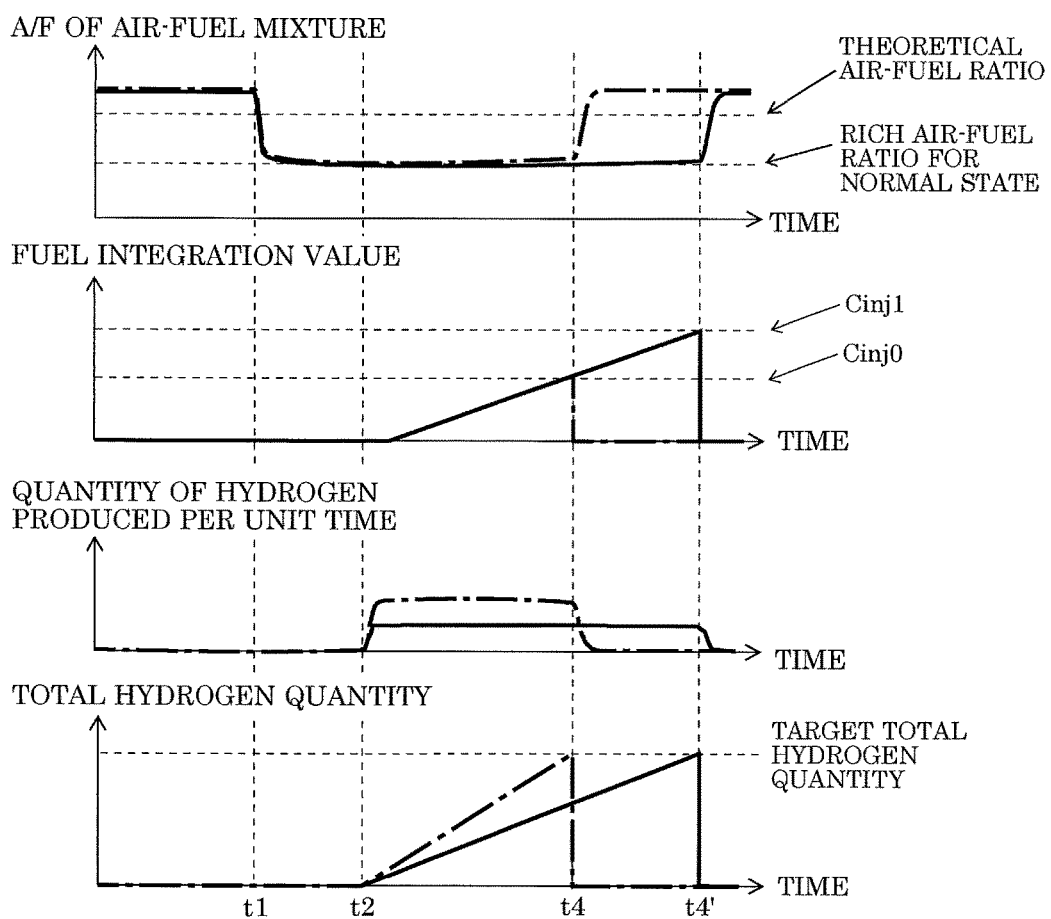

[Fig. 9]
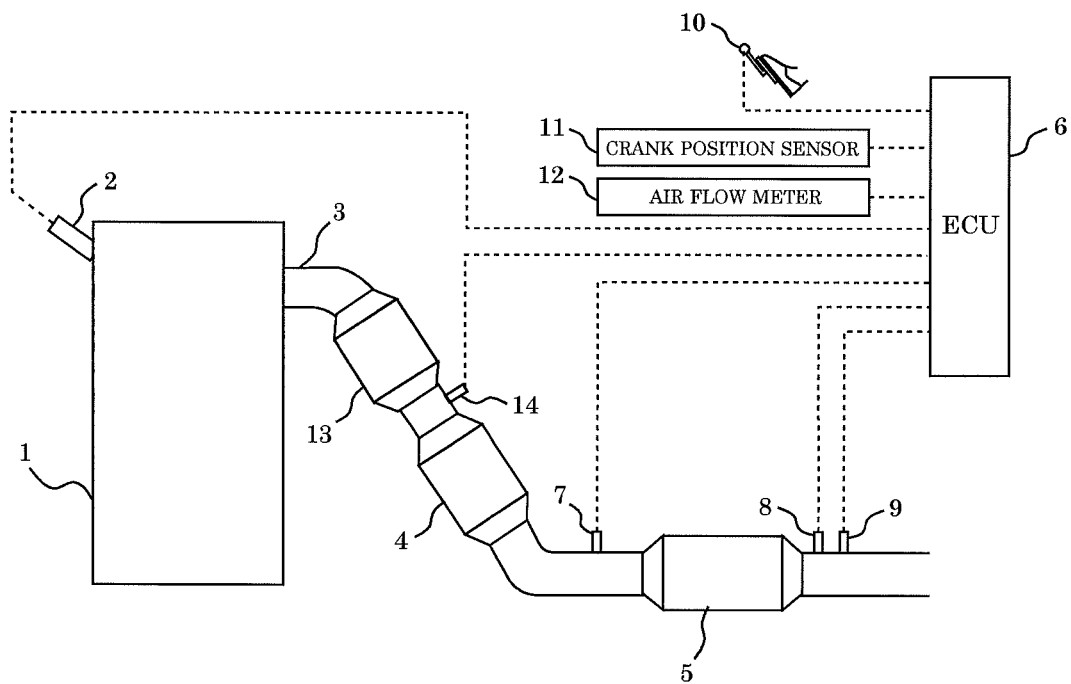

[Fig. 10]
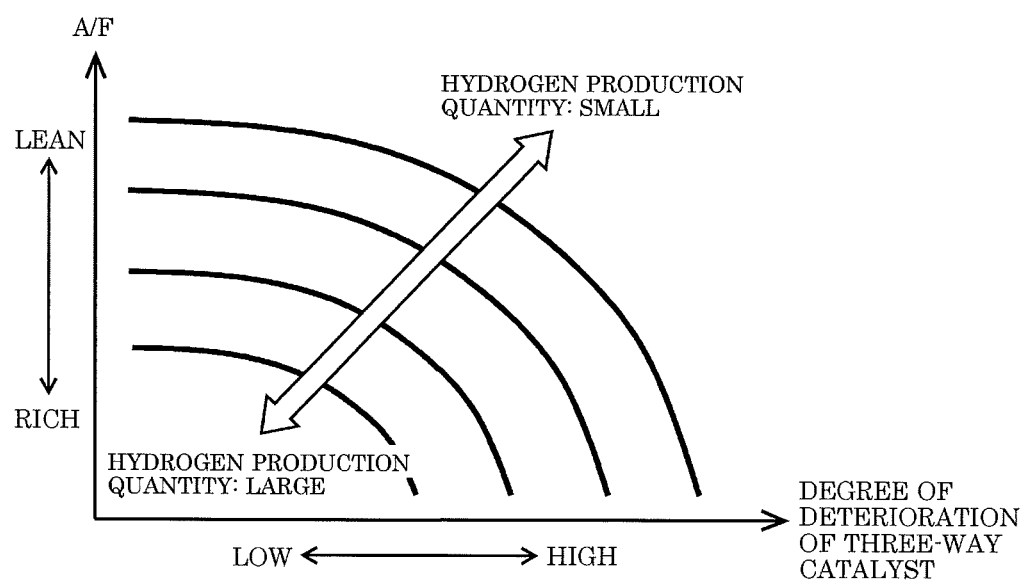

[Fig. 11]
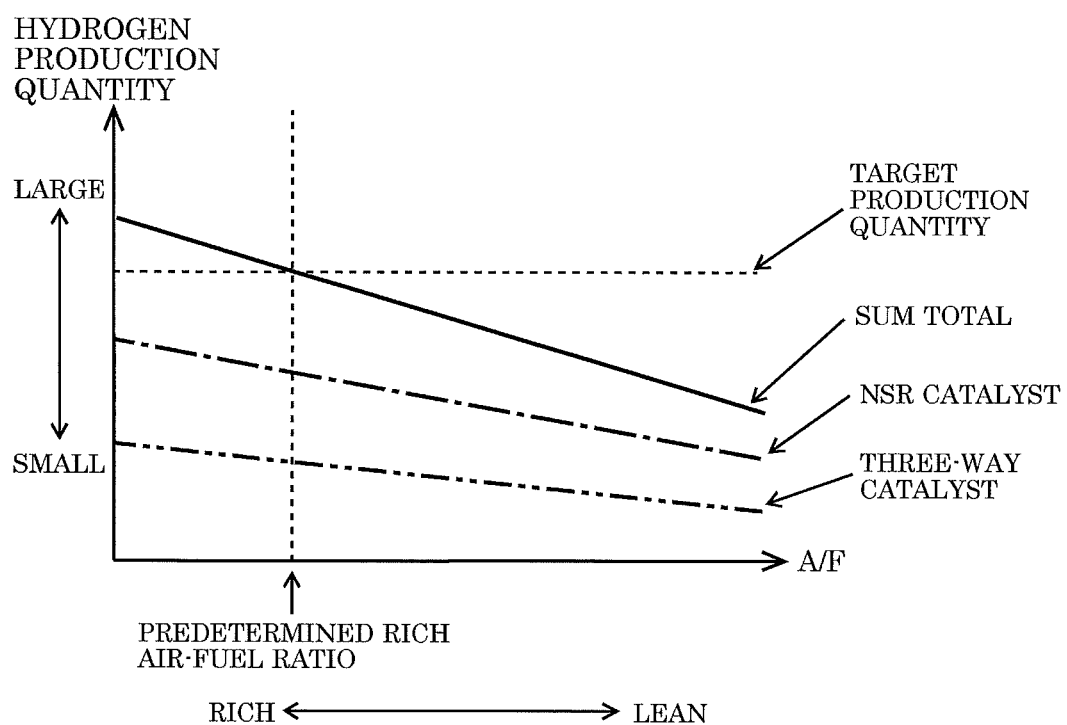

[Fig. 12]
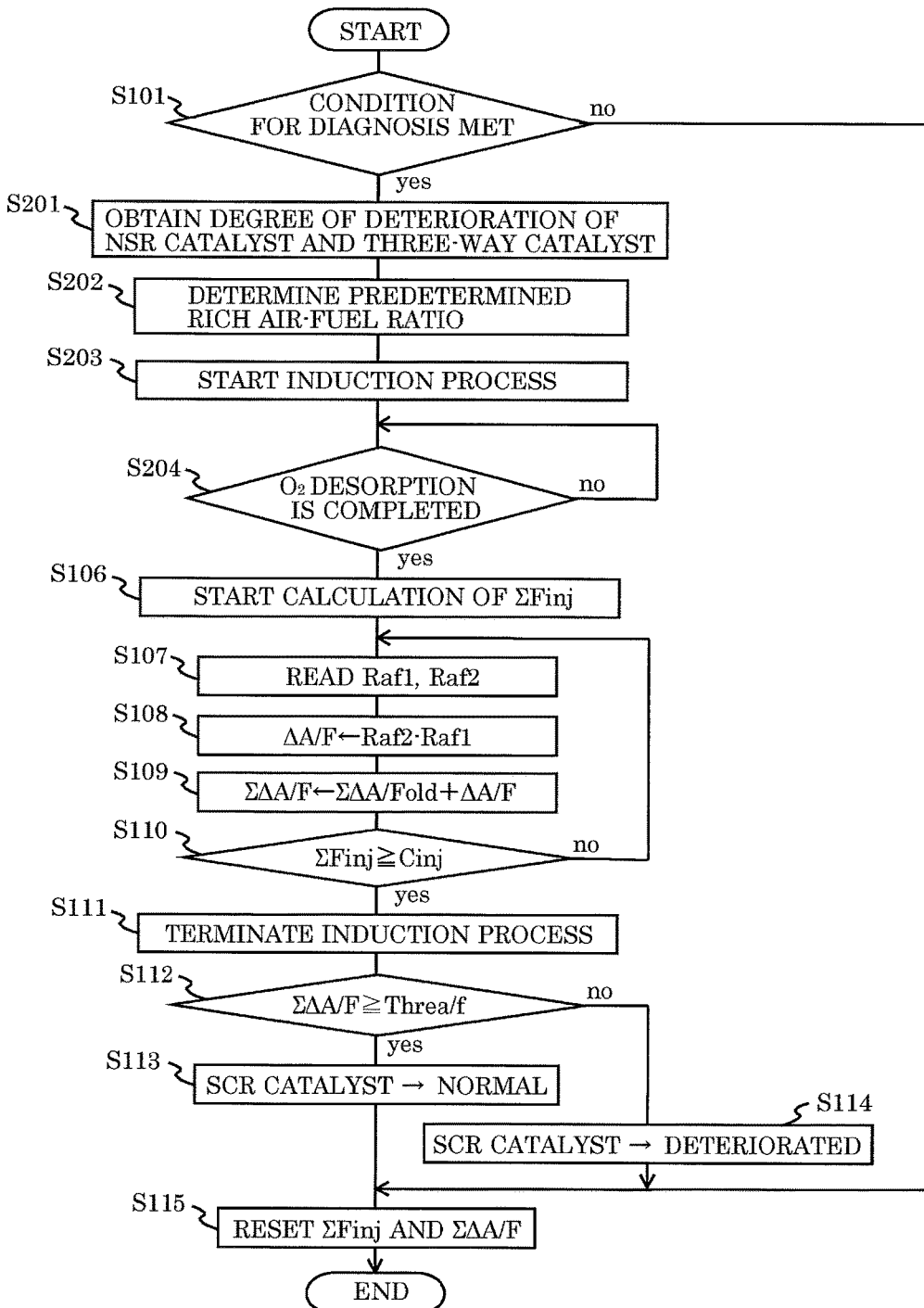

[Fig. 13]
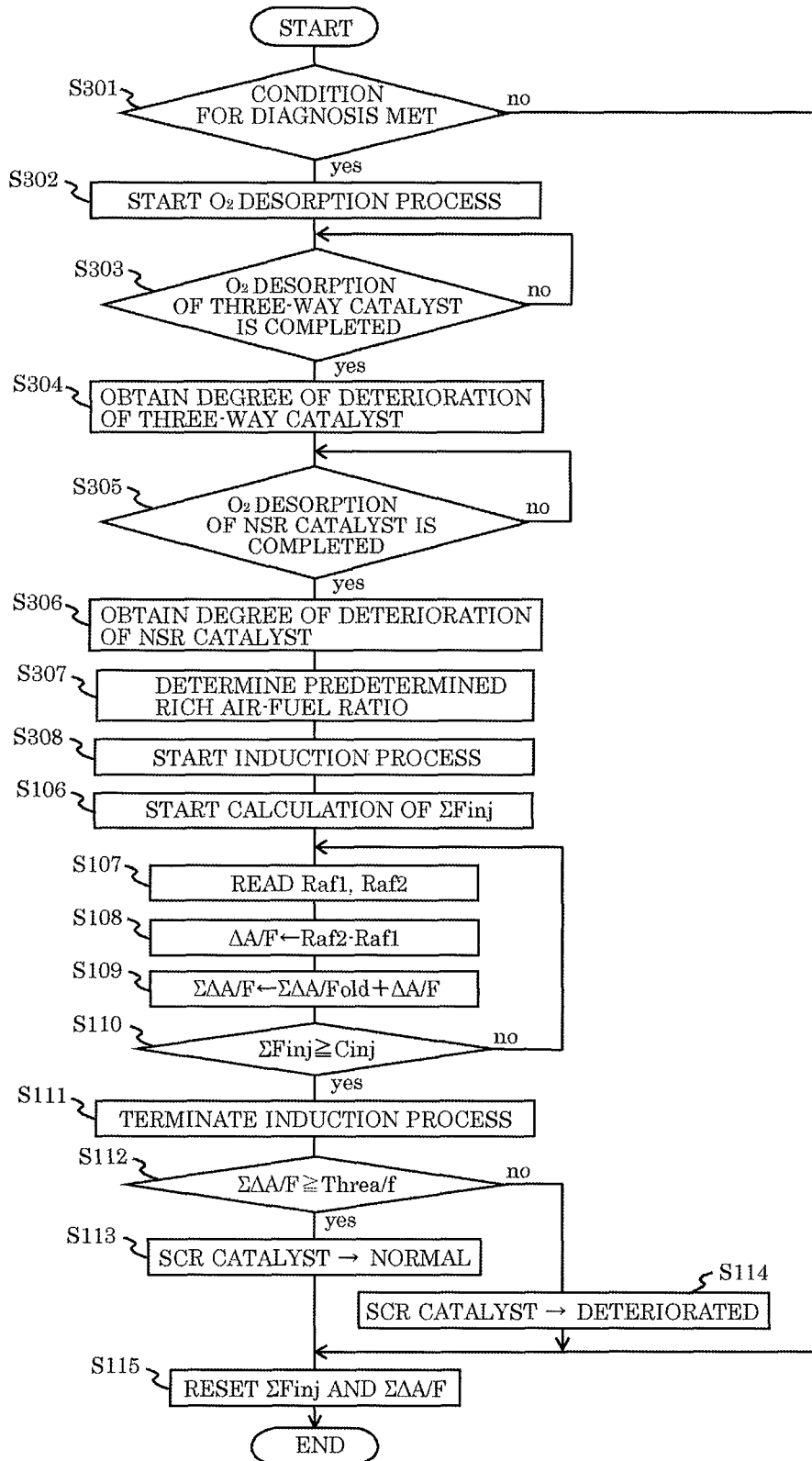

DETERIORATION DIAGNOSIS APPARATUS FOR EXHAUST GAS PURIFICATION APPARATUS

BACKGROUND OF THE INVENTION

Field of the Invention

The present invention relates to a technology for diagnosing deterioration of an exhaust gas purification apparatus provided in an exhaust passage of an internal combustion engine and more particularly to a technology for diagnosing deterioration of an exhaust gas purification apparatus having a selective catalytic reduction catalyst (SCR catalyst).

Description of the Related Art

In a known method of diagnosing deterioration of an exhaust gas purification apparatus provided in an exhaust passage of an internal combustion engine, deterioration of the exhaust gas purification apparatus is diagnosed by using measurement values of air-fuel ratio sensors or oxygen concentration sensors provided respectively in the exhaust passage upstream of the exhaust gas purification apparatus and in the exhaust passage downstream of the exhaust gas purification apparatus. Specifically, the quantity of oxygen ($O_2$) the exhaust gas purification apparatus can store (which will be hereinafter referred to as the "oxygen storage capacity") is calculated from the difference between the outputs from the aforementioned sensors arranged at two locations at the time when the air-fuel ratio of the exhaust gas flowing into the exhaust gas purification apparatus is changed from a lean air-fuel ratio higher than the theoretical air-fuel ratio to a rich air-fuel ratio lower than the theoretical air-fuel ratio, and deterioration of the exhaust gas purification apparatus is diagnosed on the basis of the oxygen storage capacity (see for example, PTL 1). The aforementioned difference between the outputs will be hereinafter referred to as the "sensor output difference".

PTL 2 discloses an exhaust emission control device of the internal combustion engine has the TWC arranged on the upstream side of an exhaust passage, an LNC arranged on this downstream side, an estimating means of a NOx quantity adsorbed to the TWC, and an estimating means of a reducing agent quantity consumed by the TWC, and has a correcting means for correcting the reducing agent quantity supplied to the LNC by taking into consideration NOx adsorbing capacity of the TWC and/or an increase-decrease in reducing agent consumption, a first learning correcting means on a change in the reducing agent consumption caused by the deterioration in the TWC, and a second learning correcting means on a change in a NOx adsorbing quantity and/or NOx reducing performance caused by the deterioration in the TWC.

PTL 3 discloses the diagnosis apparatus calculates, after activation of the catalyst or others, a difference (Vin−Vout=$\Delta V$) between an output value Vin of the inlet air-fuel ratio sensor and an output value Vout of the outlet air-fuel ratio sensor, and diagnoses the catalyst based on the $\Delta V$.

CITATION LIST

Patent Literature

PTL 1: Japanese Patent Application Laid-Open No. 2012-241652
PTL 2: Japanese Patent Application Laid-Open No. 2008-128213
PTL 3: Japanese Patent Application Laid-Open No. 2004-285840

SUMMARY OF INVENTION

The above-described technology is directed to exhaust gas purification apparatuses equipped with a three-way catalyst. Since the SCR catalyst also has an oxygen storage capability as with the three-way catalyst, one may think that deterioration of the SCR catalyst may be diagnosed by a method similar to the above-described prior art. However, the oxygen storage capacity of the SCR catalyst is smaller than the oxygen storage capacity of the three-way catalyst, and the sensor output difference with the SCR catalyst is small even when the SCR catalyst is in the normal condition without deterioration. Therefore, if measurement values of the sensors used to measure the air-fuel ratio of the exhaust gas have errors, it is not possible to calculate the oxygen storage capacity of the SCR catalyst with high accuracy based on the sensor output difference. Thus, there is a possibility that the accuracy of diagnosis may be degraded.

A possible countermeasure to the above problem one may think of is to arrange a three-way catalyst or an NOx storage reduction catalyst (NSR catalyst) in the exhaust passage upstream of the SCR catalyst to induce a water gas shift reaction in the three-way catalyst or the NSR catalyst when the air-fuel ratio of the exhaust gas is changed from a lean air-fuel ratio to a rich air-fuel ratio, thereby producing hydrogen ($H_2$), thereby enlarging the difference in the sensor output difference between when the SCR catalyst is normal and when the SCR catalyst is deteriorated.

When the three-way catalyst or the NSR catalyst is deteriorated, the quantity of hydrogen produced in the catalyst is smaller than when the catalyst is not deteriorated. Furthermore, the quantity of hydrogen produced in the three-way catalyst or the NSR catalyst varies depending on the degree of deterioration of the catalyst. If the quantity of hydrogen produced in the three-way catalyst or the NSR catalyst varies due to deterioration of the catalyst, there is a possibility that the aforementioned sensor output difference may also vary. Then, it may be difficult to diagnose deterioration of the SCR catalyst with high accuracy.

The present invention has been made in view of the above-described circumstances, and an object of the present invention is to provide a technology that enables accurate diagnosis of deterioration of an SCR catalyst using a sensor that measures the air-fuel ratio of the exhaust gas flowing into an exhaust gas purification apparatus having the SCR catalyst and a sensor that measures the air-fuel ratio of the exhaust gas flowing out of the exhaust gas purification apparatus.

To solve the above problem, a deterioration diagnosis apparatus for an exhaust gas purification apparatus according to the present invention performs an induction process, which is a process of inducing a water gas shift reaction in a hydrogen production catalyst by changing the air-fuel ratio of air-fuel mixture to be burned in an internal combustion engine from a lean air-fuel ratio to a predetermined rich air-fuel ratio when the air-fuel ratio of the air-fuel mixture is a lean air fuel ratio, measures the air-fuel ratio of the exhaust gas flowing into an SCR catalyst and the air-fuel ratio of the exhaust gas flowing out of the SCR catalyst by air-fuel ratio sensors during a period through which the induction process is performed, and diagnoses deterioration of the SCR catalyst based on the difference between the air-fuel ratios thus measured. The deterioration diagnosis apparatus adjusts the quantity of reducing agent supplied to the hydrogen production catalyst during the period through which the induction process is performed based on the degree of deterioration of the hydrogen production catalyst, thereby eliminating or reducing the variation of the quantity of hydrogen supplied to the SCR catalyst during the period through which the induction process is performed.

More specifically, a deterioration diagnosis apparatus according to the present invention is applied to an exhaust gas purification apparatus including a first exhaust gas purification device provided in an exhaust passage of an internal combustion engine capable of operating in a lean-burn mode and including a hydrogen production catalyst that brings about a water gas shift reaction using a reducing agent produced by combustion of air-fuel mixture when the air-fuel ratio of the air-fuel mixture is equal to a predetermined rich air-fuel ratio lower than the theoretical air-fuel ratio, a second exhaust gas purification device provided in the exhaust passage downstream of said first exhaust gas purification device and including an SCR catalyst that stores oxygen in exhaust gas when the air-fuel ratio of the exhaust gas is a lean air-fuel ratio higher than the theoretical air-fuel ratio and desorbs oxygen stored therein when the air-fuel ratio of the exhaust gas is lower than the theoretical air-fuel ratio, a first air-fuel ratio sensor that measures a physical quantity correlating with the air-fuel ratio of the exhaust gas flowing into said second exhaust gas purification device, and a second air-fuel ratio sensor that measures a physical quantity correlating with the air-fuel ratio of the exhaust gas flowing out of said second exhaust gas purification device. The deterioration diagnosis apparatus has a controller comprising at least one processor. The controller is configured to: start an induction process, which is a process of inducing a water gas shift reaction in said first exhaust gas purification device, when the air-fuel ratio of the air-fuel mixture is a lean air-fuel ratio by controlling the operation state of the internal combustion engine in such a way as to change the air-fuel ratio of the air-fuel mixture from the lean air-fuel ratio to said predetermined rich-air fuel ratio and terminate said induction process when the integrated value of the quantity of injected fuel over a period through which the water gas shift reaction is brought about in said first exhaust gas purification device by said induction process reaches a specific quantity; integrate a sensor output difference defined as a difference between the measurement value of said first air-fuel ratio sensor and the measurement value of said second air-fuel ratio sensor over the period through which said induction process is performed to obtain an integrated sensor output difference defined as the sum total of the sensor output difference over the period through which said induction process is performed; and diagnose deterioration of said second exhaust gas purification device using the integrated sensor output difference as a parameter. Said controller obtains the degree of deterioration of said hydrogen production catalyst and controls the operation state of the internal combustion engine in such a way as to make the quantity of the reducing agent supplied to said first exhaust gas purification device during the period through which said induction process is performed larger when the degree of deterioration obtained is high than when the degree of deterioration obtained is low.

When the air-fuel ratio of the air-fuel mixture to be burned in the internal combustion engine is controlled to a lean air-fuel ratio, and the air-fuel ratio of the exhaust gas flowing into the second exhaust gas purification device is a lean air-fuel ratio, oxygen contained in the exhaust gas is stored in the SCR catalyst in the second exhaust gas purification device. If the induction process is performed in this state, the air-fuel ratio of the exhaust gas flowing into the first exhaust gas purification device changes from a lean air-fuel ratio to a rich air fuel ratio, and the air-fuel ratio of the exhaust gas flowing into the second exhaust gas purification device also changes from the lean air-fuel ratio to a rich air-fuel ratio. Consequently, oxygen stored in the SCR catalyst is desorbed from the SCR catalyst.

The oxygen desorbed from the SCR catalyst flows out of the second exhaust gas purification device with the exhaust gas. Therefore, the air-fuel ratio of the exhaust gas flowing out of the second exhaust gas purification device is higher than the air-fuel ratio of the exhaust gas flowing into the second exhaust gas purification device. Consequently, the measurement value of the first air-fuel ratio sensor and the measurement value of the second air-fuel ratio sensor have a difference depending on the quantity of oxygen desorbed from the SCR catalyst in the second exhaust gas purification device.

When the induction process is performed and the air-fuel ratio of the exhaust gas flowing into the first exhaust gas purification device is a rich air-fuel ratio consequently, a water gas shift reaction occurs in the hydrogen production catalyst in the first exhaust gas purification device. Thus, carbon monoxide (CO) and water ($H_2O$) react to produce carbon dioxide ($CO_2$) and hydrogen ($H_2$) in the first exhaust gas purification device. The hydrogen produced in the first exhaust gas purification device flows with the exhaust gas to reach the first air-fuel ratio sensor. Since the diffusion velocity of hydrogen is higher than the other components in the exhaust gas, hydrogen reaches to the sensor element of the first air-fuel ratio sensor earlier to form a rich atmosphere around the sensor element. Consequently, the measurement value of the first air-fuel ratio sensor becomes lower than the actual air-fuel ratio. Such a deviation of the measurement value to a richer air-fuel ratio will be called a rich shift. As the hydrogen produced in the first exhaust gas purification device flows into the second exhaust gas purification device subsequently, the hydrogen is oxidized by the SCR catalyst in the second exhaust gas purification device. In consequence, the rich shift of the second air-fuel ratio sensor is smaller than the rich shift of the first air-fuel ratio sensor. Thus, the difference between the measurement value of the first air-fuel ratio sensor and the measurement value of the second air-fuel ratio sensor includes a difference depending on the quantity of hydrogen oxidized by the SCR catalyst in the second exhaust gas purification device.

As above, while the induction process is performed, the difference between the measurement value of the first air-fuel ratio sensor and the measurement value of the second air-fuel ratio sensor includes a difference depending on the quantity of hydrogen oxidized by the SCR catalyst in the second exhaust gas purification device in addition to a difference depending on the quantity of oxygen desorbed from the SCR catalyst.

When the SCR catalyst is deteriorated, the oxygen storage capability of the SCR catalyst is deteriorated, and the oxygen storage capacity of the SCR catalyst decreases. In consequence, the quantity of oxygen desorbed from the SCR catalyst in the second exhaust gas purification device during the period through which the induction process is performed is smaller when the SCR catalyst in the second exhaust gas purification device is deteriorated than when it is not deteriorated. Consequently, the measurement value of the second air-fuel ratio sensor is closer to the measurement value of the first air-fuel ratio sensor when the SCR catalyst is deteriorated than when it is not deteriorated.

Moreover, the quantity of hydrogen oxidized by the SCR catalyst in the second exhaust gas purification device is smaller when the SCR catalyst is deteriorated than when it is not deteriorated. Consequently, the quantity of hydrogen reaching the second air-fuel ratio sensor is larger, and accordingly the rich shift of the second air-fuel ratio sensor is larger when the SCR catalyst is deteriorated than when it is not deteriorated. Consequently, the measurement value of the second air-fuel ratio sensor is closer to the measurement value of the first air-fuel ratio sensor when the SCR catalyst is deteriorated than when it is not deteriorated.

As above, when the SCR catalyst in the second exhaust gas purification device is not deteriorated, the oxygen storage capability and the hydrogen oxidation capability of the SCR catalyst act cooperatively to make the difference between the measurement value of the first air-fuel ratio sensor and the measurement value of the second air-fuel ratio sensor larger. On the other hand, when the SCR catalyst in the second exhaust gas purification device is deteriorated, the deterioration of the oxygen storage capability and the deterioration of the hydrogen oxidation capability of the SCR catalyst act cooperatively to make the difference between the measurement value of the first air-fuel ratio sensor and the measurement value of the second air-fuel ratio sensor smaller. In consequence, there is a large difference in the integrated value of the difference between the measurement value of the first air-fuel ratio sensor and the measurement value of the second air-fuel ratio sensor over the period through which the induction process is performed (which will be referred to as the "integrated sensor output difference") between when the SCR catalyst in the second exhaust gas purification device is not deteriorated and when it is deteriorated.

When there is a significant difference between the integrated sensor output difference in the case where the SCR catalyst in the second exhaust gas purification device is not deteriorated and the integrated sensor output difference in the case where the SCR catalyst is deteriorated, even if the measurement value of the first air-fuel ratio sensor and/or the second air-fuel ratio sensor has an error, the effect of the error is small. Therefore, deterioration of the second exhaust gas purification device can be diagnosed with high accuracy. Moreover, it is not necessary to employ expensive sensors such as NOx sensors or $NH_3$ sensors, enabling reduction of the cost of the diagnosis apparatus.

If the total quantity of hydrogen supplied to the second exhaust gas purification device (or the total quantity of hydrogen produced in the first exhaust gas purification device) during the period through which the induction process is performed (which will be hereinafter referred to as the "total hydrogen quantity") varies, the aforementioned integrated sensor output difference will also vary. Then, there is a possibility that deterioration of the SCR catalyst cannot be diagnosed with high accuracy. Therefore, it is desirable that the total hydrogen quantity defined above be constant.

The aforementioned total hydrogen quantity correlates with the product of the quantity of hydrogen produced per unit quantity of fuel burned in the internal combustion engine (which will be hereinafter referred to as the "quantity of hydrogen produced per unit fuel") and the integrated value of the quantity of injected fuel over the period through which the water gas shift reaction is brought about in the first exhaust gas purification device by the induction process. This integrated value will be hereinafter referred to as the "fuel integration value". The quantity of hydrogen produced per unit fuel varies depending on the air-fuel ratio of the air-fuel mixture. However, while the induction process is performed, the quantity of hydrogen produced per unit fuel may be considered to be constant, because the air-fuel ratio of the air-fuel mixture is fixed at the predetermined rich air-fuel ratio during that period. Then, the aforementioned total hydrogen quantity may be considered to correlate with the aforementioned fuel integration value. Therefore, if the induction process is terminated at the time when the aforementioned fuel integration value reaches a certain quantity (which will be referred to as "specific quantity"), the variation of the aforementioned total hydrogen quantity can be eliminated or reduced.

However, the quantity of hydrogen produced per unit fuel varies depending on the state of deterioration of the aforementioned hydrogen production catalyst. For example, if the aforementioned predetermined rich air-fuel ratio and the aforementioned specific quantity are fixed, the quantity of hydrogen produced per unit fuel is smaller when the degree of deterioration of the hydrogen production catalyst is high than when it is low. In consequence, the total hydrogen quantity is smaller when the degree of deterioration of the hydrogen production catalyst is high than when it is low. As above, if the total hydrogen quantity varies due to deterioration of the hydrogen production catalyst, the integrated sensor output difference will also vary. Then, there is a possibility that deterioration of the SCR catalyst cannot be diagnosed with high accuracy.

According to the present invention, the operation state of the internal combustion engine is controlled in such a way that the quantity of reducing agent supplied to the first exhaust gas purification device during the period through which the aforementioned induction process is performed is made larger when the degree of deterioration of the hydrogen production catalyst is high than when it is low. The reducing agent mentioned above is a reducing agent that contributes to the water gas shift reaction (e.g. carbon monoxide).

As described above, the total hydrogen quantity is smaller when the degree of deterioration of the hydrogen production catalyst is high than when it is low. On the other hand, the total hydrogen quantity is larger when quantity of reducing agent supplied to the first exhaust gas purification device during the period through which the induction process is performed is large than when it is small. Therefore, if the quantity of reducing agent supplied to the first exhaust gas purification device during the period through which the induction process is performed is made larger when the degree of deterioration of the hydrogen production catalyst is high than when it is low, a decrease of the total hydrogen quantity due to deterioration of the hydrogen production catalyst can be compensated for by an increase of the total hydrogen quantity resulting from the increase in the quantity of reducing agent. Thus, the variation of the total hydrogen quantity due to deterioration of the hydrogen production catalyst can be eliminated or reduced. Therefore, deterioration of the SCR catalyst can be diagnosed with high accuracy even when the hydrogen production catalyst is deteriorated.

A possible method of adjusting the quantity of reducing agent supplied to the first exhaust gas purification device during the period through which the induction process is performed is to adjust the aforementioned predetermined rich air-fuel ratio. Thus, the controller may make the predetermined rich air-fuel ratio lower when the degree of deterioration of the hydrogen production catalyst is high than when it is low. The quantity of reducing agent produced per unit quantity of fuel is larger when the degree of richness of the air-fuel ratio of the air-fuel mixture is high than when it is low. Therefore, if the aforementioned predetermined rich air-fuel ratio is made low when the degree of deterioration of the hydrogen production catalyst is high than when it is low, the quantity of reducing agent supplied to the first exhaust gas purification device during the period through which the induction process is performed can be made larger when the degree of deterioration of the hydrogen production catalyst is high than when it is low.

Another possible method of adjusting the quantity of reducing agent supplied to the first exhaust gas purification device during the period through which the induction process is performed is to change the aforementioned specific quantity without changing the aforementioned predetermined rich air-fuel ratio. Thus, the controller may make the aforementioned specific quantity larger when the degree of deterioration of the hydrogen production catalyst is high than when it is low. The quantity of reducing agent supplied to the first exhaust gas purification device during the period through which the induction process is performed is larger when the aforementioned predetermined quantity is large than when it is small. Therefore, if the aforementioned specific quantity is made larger when the degree of deterioration of the hydrogen production catalyst is high than when it is low, the quantity of reducing agent supplied to the first exhaust gas purification device during the period through which the induction process is performed can be made larger when the degree of deterioration of the hydrogen production catalyst is high than when it is low.

In the deterioration diagnosis apparatus for an exhaust gas purification apparatus according to the present invention, the aforementioned hydrogen production catalyst may be a catalyst having an oxygen storage capability of storing oxygen in the exhaust gas when the air-fuel ratio of the exhaust gas is a lean air-fuel ratio higher than the theoretical air-fuel ratio and desorbing stored oxygen when the air-fuel ratio of the exhaust gas is equal to or lower than the theoretical air-fuel ratio. In the deterioration diagnosis apparatus as such, before performing the induction process, the controller may perform an $O_2$ desorption process in which the air-fuel ratio of the exhaust gas discharged from the internal combustion engine is changed to an air-fuel ratio for desorption lower than or equal to the aforementioned predetermined rich air-fuel ratio to desorb oxygen stored in the hydrogen production catalyst. The controller may measure the length of a period from the start of the $O_2$ desorption process to the time at which the measurement value of the aforementioned first air-fuel ratio sensor shows a rich air-fuel ratio and obtain the degree of deterioration of the hydrogen production catalyst based on the length of that period.

In order to eliminate or reduce the variation of the aforementioned total hydrogen quantity due to deterioration of the hydrogen production catalyst, it is preferred that the quantity of reducing agent supplied to the first exhaust gas purification device during the period through which the induction process is performed is adjusted in accordance with the degree of deterioration of the hydrogen production catalyst at the time when the induction process is started. If the degree of deterioration of the hydrogen production catalyst is obtained by performing the $O_2$ desorption process before performing the induction process, the induction process is performed taking account of the degree of deterioration of the hydrogen production catalyst thus obtained. Therefore, the quantity of reducing agent supplied to the first exhaust gas purification device during the period through which the induction process is performed can be set to a quantity adapted to the degree of deterioration of the hydrogen production catalyst at the time of start of the induction process. Thus, the variation of the total hydrogen quantity due to deterioration of the hydrogen production catalyst can be eliminated or reduced with improved reliability.

As above, the present invention enables accurate diagnosis of deterioration of an SCR catalyst using a sensor that measures the air-fuel ratio of the exhaust gas flowing into an exhaust gas purification apparatus having the SCR catalyst and a sensor that measures the air-fuel ratio of the exhaust gas flowing out of the exhaust gas purification apparatus.

Further features of the present invention will become apparent from the following description of exemplary embodiments with reference to the attached drawings.

BRIEF DESCRIPTION OF DRAWINGS

FIG. 2 is a graph showing relationship between the NOx purification capability and the oxygen storage capacity of an SCR catalyst.

FIG. 3 is a timing chart showing the change with time of the air-fuel ratio of the air-fuel mixture (A/F), the measurement value of the first air-fuel ratio sensor (A/F1), and the measurement value of the second air-fuel ratio sensor (A/F2) in a case where the induction process is performed.

FIG. 4 is a timing chart showing the change with time of the air-fuel ratio of the air-fuel mixture (A/F), the integration value of the fuel injection quantity, the quantity of hydrogen produced per unit time, and the total hydrogen quantity in a case where the induction process is performed in a state in which an NSR catalyst is deteriorated.

FIG. 5 is a graph showing relationship between the degree of deterioration of the NSR catalyst, the air-fuel ratio of the air-fuel mixture (A/F), and the quantity of hydrogen produced per unit fuel.

FIG. 6 is a timing chart showing the change with time of the quantity of hydrogen produced per unit time and the total hydrogen quantity in a case where the induction process is performed with the air-fuel ratio being set to an air-fuel ratio adapted to the degree of deterioration of the NSR catalyst.

FIG. 7 is a flow chart of a processing routine executed by the ECU when performing diagnosis of deterioration of the SCR catalyst in the first embodiment.

FIG. 8 is a timing chart showing the change with time of the quantity of hydrogen produced per unit time and the total hydrogen quantity in a case where the induction process is performed over a length of time adapted to the degree of deterioration of the NSR catalyst.

FIG. 9 is a diagram showing the general configuration of the exhaust system of an internal combustion engine to which the present invention is applied in a second embodiment.

FIG. 10 is a graph showing relationship between the degree of deterioration of the three-way catalyst, the air-fuel ratio of the air-fuel mixture (A/F), and the quantity of hydrogen produced per unit fuel.

FIG. 11 is a graph showing a method of determining a predetermined rich air-fuel ratio in the second embodiment.

FIG. 12 is a flow chart of a processing routine executed by the ECU when performing diagnosis of deterioration of the SCR catalyst in the second embodiment.

FIG. 13 is a flow chart of a processing routine executed by the ECU when performing diagnosis of deterioration of the SCR catalyst in a third embodiment.

DESCRIPTION OF EMBODIMENTS

Figure 1:
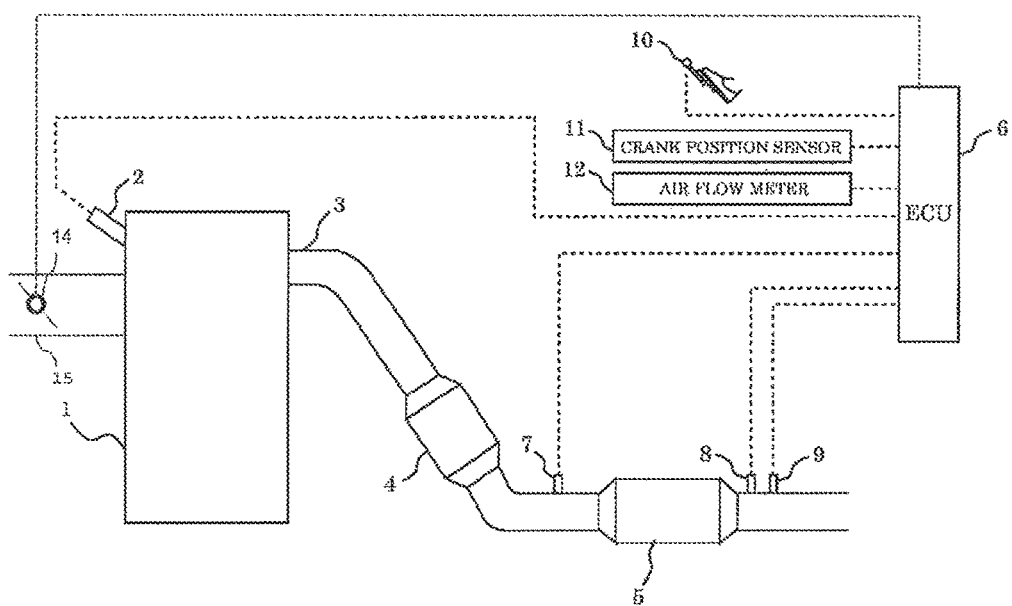
FIG. 1 is a diagram showing the configuration of an exhaust system of an internal combustion engine to which the present invention is applied in a first embodiment.

In the following, specific embodiments of the present invention will be described with reference to the drawings. The dimensions, materials, shapes, relative arrangements, and other features of the components that will be described in connection with the embodiments are not intended to limit the technical scope of the present invention only to them, unless particularly stated.

<First Embodiment>

A first embodiment of the present invention will be described with reference to FIGS. 1 to 8. FIG. 1 schematically shows the general configuration of the exhaust system of an internal combustion engine to which the present invention is applied. The internal combustion engine 1 shown in FIG. 1 is a spark-ignition internal combustion engine (gasoline engine) that can operate by combusting air-fuel mixture having a lean air-fuel ratio higher than the theoretical air fuel ratio (in a lean-burn mode). Alternatively, the internal combustion engine may be a compression-ignition internal combustion engine.

The internal combustion engine 1 has a fuel injection valve 2 that supplies fuel into a cylinder. The fuel injection valve 2 may inject fuel into an intake port of each cylinder or inject fuel into each cylinder.

The internal combustion engine 1 is connected with an intake passage 15. A intake throttle valve 14 is provided in the intake passage. The internal combustion engine 1 is connected with an exhaust pipe 3 through which the gas having been burned in the cylinder (exhaust gas) flows. In the middle of the exhaust pipe 3, a first catalyst casing 4 is provided. The first catalyst casing 4 houses an NOx storage reduction catalyst (which will be hereinafter referred to as the "NSR catalyst"), which constitutes the hydrogen production catalyst according to the present invention. Specifically, the first catalyst casing 4 houses a honeycomb structure coated with a coating layer such as alumina, a noble metal (such as platinum Pt or palladium Pd) supported on the coating layer, a promotor such as ceria ($CeO_2$) supported on the coating layer, and an NOx storage material (such as alkali or alkaline earth) supported on the coating layer, The first catalyst casing 4 constitutes the first exhaust gas purification device according to the present invention.

In the exhaust pipe 3 downstream of the first catalyst casing 4, a second catalyst casing 5 is provided. The second catalyst casing 5 houses an SCR catalyst. Specifically, the second catalyst casing 5 houses a honeycomb structure made of cordierite or an Fe—Cr—Al heat-resisting steel, a zeolite-based coating layer on the honeycomb structure, and a transition metal (such as copper Cu or iron Fe) supported on the coating layer. The second catalyst casing 5 constitutes the second exhaust gas purification device according to the present invention.

The internal combustion engine 1 having the above-described structure is equipped with an ECU (Electronic Control Unit) 6. The ECU 6 is an electronic control unit composed of a CPU, a ROM, a RAM, and a backup RAM etc. The ECU 6 is electrically connected with the intake throttle valve and various sensors including a first air-fuel ratio sensor 7, a second air-fuel ratio sensor 8, an exhaust gas temperature sensor 9, an accelerator position sensor 10, a crank position sensor 11, and an air flow meter 12.

The first air-fuel ratio sensor 7 is attached to the exhaust pipe 3 between the first catalyst casing 4 and the second catalyst casing 5. The first air-fuel ratio sensor 7 outputs an electrical signal representing the air-fuel ratio of the exhaust gas flowing out of the first catalyst casing 4 (or the exhaust gas flowing into the second catalyst casing 5). The first air-fuel ratio sensor 7 constitutes the first air-fuel ratio sensor according to the present invention. Alternatively, an oxygen concentration sensor may be provided instead of the first air-fuel ratio sensor 7, and the air-fuel ratio of the exhaust gas flowing out of the first catalyst casing 4 may be calculated from a measurement value of the oxygen concentration sensor.

The second air-fuel ratio sensor 8 is attached to the exhaust pipe 3 downstream of the second catalyst casing 5. The second air-fuel ratio sensor 8 outputs an electrical signal relating to the air-fuel ratio of the exhaust gas flowing out of the second catalyst casing 5. The second air-fuel ratio sensor 8 constitutes the second air-fuel ratio sensor according to the present invention. Alternatively, an oxygen concentration sensor may be provided instead of the second air-fuel ratio sensor 8, and the air-fuel ratio of the exhaust gas flowing out of the second catalyst casing 5 may be calculated from a measurement value of the oxygen concentration sensor.

The exhaust gas temperature sensor 9 is attached to the exhaust pipe downstream of the second catalyst casing 5. The exhaust gas temperature sensor 9 outputs an electrical signal relating to the temperature of the exhaust gas flowing out of the second catalyst casing 5. The accelerator position sensor 10 is attached to the accelerator pedal and outputs an electrical signal representing the operation amount of the accelerator pedal (or the accelerator opening degree). The crank position sensor 11 is attached to the internal combustion engine 1 and outputs an electrical signal relating to the rotational position of the engine output shaft (or the crankshaft). The air flow meter 12 is attached to an intake pipe (not shown) of the internal combustion engine 1 and outputs an electrical signal relating to the quantity (mass) of fresh air flowing in the intake pipe.

The ECU 6 controls the operation state of the internal combustion engine 1 on the basis of the output signals of the above-described sensors. For instance, the ECU 6 calculates a target air-fuel ratio of the air-fuel mixture based on the engine load, which is calculated based on the output signal of the accelerator position sensor 10 (accelerator opening degree), and the engine speed, which is calculated based on the output signal of the crank position sensor 11. The ECU 6 calculates a target fuel injection quantity (or the duration of fuel injection) based on the target air-fuel ratio and the output signal of the air flow meter 12 (intake air quantity) and causes the fuel injection valve 2 to operate in accordance with the target fuel injection quantity. When the operation state of the internal combustion engine 1 is in a low-speed and low-load range or in a middle-speed and middle-load range, the ECU 6 sets the target air-fuel ratio to a lean air-fuel ratio higher than the theoretical air-fuel ratio. When the operation state of the internal combustion engine 1 is in a high-load range or in a high-speed range, the ECU 6 sets the target air-fuel ratio to a rich air-fuel ratio lower than the theoretical air-fuel ratio. As above, when the operation state of the internal combustion engine 1 is in a low-speed and low-load range or in a middle-speed and middle-load range (which will be collectively referred to as the "lean operation range"), the fuel consumption can be made small by operating the internal combustion engine 1 in a lean-burn mode with the target air-fuel ratio set to a lean air-fuel ratio.

When the operation state of the internal combustion engine 1 is in the aforementioned lean operation range, the ECU 6 performs a rich spike process when appropriate. The rich spike process is the process of adjusting the fuel injection quantity and the intake air quantity in such a way as to make the concentration of oxygen in the exhaust gas low and to make the concentration of hydrogen and carbon monoxide high. The NSR catalyst housed in the first catalyst casing 4 stores or adsorbs NOx in the exhaust gas when the oxygen concentration in the exhaust gas flowing into the first catalyst casing 4 is high (in other words, when the air-fuel ratio of the exhaust gas is a lean air-fuel ratio). On the other hand, when the oxygen concentration in the exhaust gas flowing into the first catalyst casing 4 is low and the exhaust gas contains reductive components such as hydrocarbon and carbon monoxide (in other words, when the air-fuel ratio of the exhaust gas is a rich air-fuel ratio), the NSR catalyst desorbs NOx stored therein and reduces the desorbed NOx into nitrogen ($N_2$) and/or ammonia ($NH_3$). Consequently, if the rich spike process is performed, the NOx storage capability of the NSR catalyst is recovered.

The ECU 6 is adapted to perform the rich spike process to prevent saturation of the NOx storage capacity of the NSR catalyst, when the amount of NOx (NOx storage amount) stored in the NSR catalyst in the first catalyst casing 4 reaches or exceeds a certain amount, when the operation time (more preferably, the operation time in the state in which the target air-fuel ratio is set to a lean air-fuel ratio) since the completion of the last rich spike process reaches or exceeds a certain time, or when the travel distance (more preferably, the travel distance in the state in which the target air-fuel ratio is set to a lean air-fuel ratio) after the completion of the last rich spike process reaches or exceeds a certain distance.

A specific way of performing the rich spike process may be to decrease the air-fuel ratio of the air-fuel mixture to be burned in the internal combustion engine 1 by increasing the target fuel injection quantity of the fuel injection valve 2 and/or decreasing the degree of opening of the intake throttle valve. In the case where the fuel injection valve 2 is adapted to inject fuel directly into the cylinder, the rich spike process may be performed by injecting fuel through the fuel injection valve 2 during the exhaust stroke of the cylinder.

Then, the SCR catalyst in the second catalyst casing 5 adsorbs ammonia contained in the exhaust gas and reduces NOx contained in the exhaust gas with the adsorbed ammonia. The ammonia supplied to the SCR catalyst in the second catalyst casing 5 is produced in the NSR catalyst in the first catalyst casing 4. Thus, when the rich spike process is performed, a portion of NOx desorbed from the NSR catalyst in the first catalyst casing 4 is reduced into ammonia by reaction with hydrocarbon or hydrogen in the exhaust gas. The quantity of ammonia thus produced in the NSR catalyst varies depending on the execution interval of the rich spike process and the air-fuel ratio of the exhaust gas at the time when the rich spike process is executed. When it is necessary to supply ammonia to the SCR catalyst, the ECU 6 may set the execution interval of the rich spike process to a time suitable for generation of ammonia and set the air-fuel ratio of the exhaust gas at the time when the rich spike process is executed to an air-fuel ratio suitable for generation of ammonia (e.g. approximately 14.1).

As the rich spike process is performed for various purposes as described above, NOx contained in the exhaust gas discharged during lean-burn operation of the internal combustion engine 1 can be removed. If the SCR catalyst housed in the second catalyst casing 5 is deteriorated, there is a possibility that NOx that has not been removed in the first catalyst casing 4 during lean-burn operation of the internal combustion engine 1 may be emitted to the atmosphere without being removed in the second catalyst casing 5 also. Therefore, when the SCR catalyst in the second catalyst casing 5 is deteriorated, it is necessary to detect the deterioration of the SCR catalyst promptly and to prompt the driver of the vehicle to fix it or to disable lean-burn operation of the internal combustion engine 1. In the following, a method of diagnosing deterioration of the SCR catalyst housed in the second catalyst casing 5 will be described.

The SCR catalyst stores oxygen in the exhaust gas by an effect of the transition metal in the SCR catalyst when the air-fuel ratio of the exhaust gas is a lean air-fuel ratio. The oxygen stored in the SCR catalyst is desorbed from the SCR catalyst when the air-fuel ratio of the exhaust gas changes from a lean air-fuel ratio to a rich air-fuel ratio. The oxygen storage capability of the SCR catalyst correlates with the NOx purification capability of the SCR catalyst. FIG. 2 is a graph showing relationship between the NOx purification capability of the SCR catalyst and the amount of oxygen that the SCR catalyst can store (i.e. the oxygen storage capacity). As shown in FIG. 2, when the NOx purification capability (or the NOx removal rate) of the SCR catalyst is sufficiently high (e.g. when the NOx removal rate is in the range between 80% and 100%), the oxygen storage capacity of the SCR catalyst is also sufficiently large. As the NOx purification capability of the SCR catalyst decreases (e.g. when the NOx removal rate becomes lower than 80%), the oxygen storage capacity also decreases. Therefore, whether or not the NOx purification capability of the SCR catalyst is deteriorated can be diagnosed by determining the oxygen storage capacity of the SCR catalyst.

The oxygen storage capacity of the SCR catalyst correlates with the quantity of oxygen desorbed from the SCR catalyst when the air-fuel ratio of the exhaust gas is changed from a lean air-fuel ratio to a rich air-fuel ratio. The quantity of oxygen desorbed from the SCR catalyst when the air-fuel ratio of the exhaust gas is changed from a lean air-fuel ratio to a rich air-fuel ratio can be calculated based on the difference between the air-fuel ratio (or the oxygen concentration, alternatively) of the exhaust gas flowing into the SCR catalyst and the air-fuel ratio (or the oxygen concentration, alternatively) of the exhaust gas flowing out of the SCR catalyst.

For example, in a state in which the air-fuel ratio of the exhaust gas has been changed from a lean air-fuel ratio to a rich air-fuel ratio, the difference between the measurement value of the first air-fuel ratio sensor 7 and the measurement value of the second air-fuel ratio sensor 8 is calculated. The quantity of oxygen Aox desorbed from the SCR catalyst at the time can be calculated by substituting the difference thus calculated in the following equation (1):

$$Aox = \Delta A/F * a * Qinj \qquad (1).$$

In the above equation (1), $\Delta A/F$ is the value obtained by subtracting the measurement value of the first air-fuel ratio sensor 7 from the measurement value of the second air-fuel ratio sensor 8, a is the percentage by mass of the oxygen in the air, and Qinj is the fuel injection quantity.

When the air-fuel ratio of the exhaust gas is changed from a lean air-fuel ratio to a rich air-fuel ratio, oxygen is desorbed from the SCR catalyst, so that the measurement value of the second air-fuel ratio sensor 8 shows the theoretical air-fuel ratio. After the oxygen stored in the SCR catalyst has been desorbed fully, the measurement value of the second air-fuel ratio sensor 8 shows a rich air-fuel ratio.

Therefore, the total quantity of oxygen desorbed from the SCR catalyst (which is equal to the oxygen storage capacity of the SCR catalyst) can be calculated by executing the calculation using the above equation (1) repeatedly over the period from the time at which the air-fuel ratio of the exhaust gas is changed from a lean air-fuel ratio to a rich air fuel ratio to the time at which the measurement value of the second air-fuel ratio sensor 8 shows a rich-air fuel ratio, and summing up or integrating the calculation results. If diagnosis of deterioration of the SCR catalyst is conducted based on the oxygen storage capacity thus calculated, diagnosis of deterioration of the SCR catalyst can be carried out without using an expensive sensor such as an NOx sensor or an $NH_3$ sensor.

The oxygen storage capacity of the normal SCR catalyst (or SCR catalyst that is not deteriorated) is smaller than that of the three-way catalyst containing an oxygen storage material such as ceria or the NSR catalyst. For this reason, if the measurement value of the first air-fuel ratio sensor 7 or the second air-fuel ratio sensor 8 has an error, there is a possibility that the calculated value of the oxygen storage capacity may be smaller or larger than the actual oxygen storage capacity. In consequence, there is a possibility that a wrong diagnosis that the SCR catalyst is deteriorated may be made in spite of the fact that the SCR catalyst is not deteriorated or that a wrong diagnosis that the SCR catalyst is not deteriorated may be made in spite of the fact that the SCR catalyst is deteriorated.

As a countermeasure, in this embodiment, a process (induction process) for inducing a water gas shift reaction in the NSR catalyst in the first catalyst casing 4 is performed when diagnosing deterioration of the SCR catalyst. The induction process is the process of making the air-fuel ratio of the exhaust gas flowing into the first catalyst casing 4 equal to a predetermined rich air-fuel ratio suitable for the water gas shift reaction when the operation state of the internal combustion engine 1 is in the lean operation range. Specifically, the induction process is the process of making the air-fuel ratio of the air-fuel mixture to be burned in the internal combustion engine 1 and the air-fuel ratio of the exhaust gas discharged from the internal combustion engine 1 equal to the aforementioned predetermined rich air-fuel ratio by increasing the fuel injection quantity and/or decreasing the intake air quantity, as with the aforementioned rich spike process.

How the induction process is performed specifically will be described with reference to a timing chart in FIG. 3. FIG. 3 is a timing chart showing the change with time of the air-fuel ratio of the air-fuel mixture (A/F), the measurement value of the first air-fuel ratio sensor 7 (A/F1), and the measurement value of the second air-fuel ratio sensor 8 (A/F2) in a case where the induction process is performed. The measurement values shown in FIG. 3 are those in a case where the SCR catalyst is in a normal condition without deterioration.

In FIG. 3, when the induction process is started (at t1 in FIG. 3), the air-fuel ratio of the air-fuel mixture (A/F) is changed from a lean air-fuel ratio to the aforementioned predetermined rich air-fuel ratio. The air-fuel ratio of the exhaust gas flowing into the first catalyst casing 4 also changes from a lean air fuel ratio to the aforementioned predetermined rich air-fuel ratio accordingly. As the exhaust gas having the aforementioned predetermined rich air-fuel ratio flows into the first catalyst casing 4, oxygen stored in the NSR catalyst is desorbed from the NSR catalyst, so that the air-fuel ratio of the exhaust gas flowing out of the first catalyst casing 4 becomes equal to the theoretical air-fuel ratio higher than the aforementioned predetermined rich air-fuel ratio. Therefore, while oxygen is being desorbed from the NSR catalyst, the measurement value of the first air-fuel ratio sensor 7 (A/F1) and the measurement value of the second air-fuel ratio sensor 8 (A/F2) show the theoretical air-fuel ratio.

Thereafter, after the oxygen stored in the NSR catalyst has been desorbed fully, the actual air-fuel ratio of the exhaust gas flowing out of the first catalyst casing 4 changes from the theoretical air-fuel ratio to the aforementioned rich air-fuel ratio (at time t2 in FIG. 3). After oxygen has been desorbed completely from the NSR catalyst in the first catalyst casing 4, a water gas shift reaction is brought about in the NSR catalyst. Specifically, reaction of water and carbon monoxide in the exhaust gas is promoted by the NSR catalyst in the first catalyst casing 4, whereby hydrogen and carbon dioxide are produced. The hydrogen produced in the first catalyst casing 4 flows with the exhaust gas to reach the first air-fuel ratio sensor 7. Since the diffusion velocity of hydrogen is higher than the other components in the exhaust gas, a large part of the surface of the sensor element of the first air-fuel ratio sensor 7 is covered with hydrogen and exposed to a rich atmosphere. Consequently, the measurement value of the first air-fuel ratio sensor 7 (A/F1) deviates from the actual air-fuel ratio of the exhaust gas (represented by the chain line in FIG. 3) to a lower air-fuel ratio (represented by the solid line in FIG. 3). As the hydrogen produced in the first catalyst casing 4 flows into the second catalyst casing 5, hydroxide ion (OH) bonded with the transition metal in the SCR catalyst reacts with hydrogen contained the exhaust gas to produce water. Thus, hydrogen produced in the first catalyst casing 4 is oxidized and consumed in the second catalyst casing 5. In consequence, the measurement value of the second air-fuel ratio sensor 8 (A/F2) has little rich shift (namely, hardly deviates to a richer air-fuel ratio). Moreover, as the exhaust gas having the aforementioned predetermined rich air-fuel ratio flows into the second catalyst casing 5, oxygen is desorbed from the SCR catalyst, and therefore the measurement value of the second air-fuel ratio sensor 8 (A/F2) becomes higher than the actual air-fuel ratio of the exhaust gas flowing into the second catalyst casing 5. In consequence, between the measurement value of the first air-fuel ratio sensor 7 (A/F1) and the measurement value of the second air-fuel ratio sensor 8 (A/F2), there is a difference depending on the quantity of hydrogen oxidized in the SCR catalyst in the second catalyst casing 5 in addition to a difference depending on the quantity of oxygen desorbed from the SCR catalyst in the second catalyst casing 5. Even after the oxygen stored in the SCR catalyst in the second catalyst casing 5 has been desorbed fully (after time t3 in FIG. 3), hydrogen is produced in the first catalyst casing 4, and consequently there is a sufficient difference between the measurement value of the first air-fuel ratio sensor 7 (A/F1) and the measurement value of the second air-fuel ratio sensor 8 (A/F2). This difference remains continuously until the end of the induction process (at time t4 in FIG. 3).

If the SCR catalyst is deteriorated when the above-described induction process is performed, the oxygen storage capability and the hydrogen oxidation capability of the SCR catalyst are both deteriorated, and the quantity of oxygen desorbed from the SCR catalyst decreases accordingly, and the quantity of hydrogen oxidized and consumed in the SCR catalyst also decreases accordingly. Therefore, if the SCR catalyst is not deteriorated when the induction process is performed, the oxygen storage capability and the hydrogen oxidation capability of the SCR catalyst act cooperatively to make the integrated value of the difference (or the integrated sensor output difference) between the measurement value of the first air-fuel ratio sensor 7 and the measurement value of the second air-fuel ratio sensor 8 over the period through which the induction process is performed larger. On the other hand, if the SCR catalyst is deteriorated when the induction process is performed, the deterioration of the oxygen storage capability of the SCR catalyst and the deterioration of the hydrogen oxidation capability of the SCR catalyst act cooperatively to make the integrated sensor output difference smaller. Therefore, there is a significant difference between the integrated sensor output difference in the case where the SCR catalyst in the second catalyst casing 5 is not deteriorated and the integrated sensor output difference in the case where the SCR catalyst is deteriorated. Based on the above fact, it is possible to diagnose whether the SCR catalyst is deteriorated or not by determining in advance the value of the integrated sensor output difference in the case where the SCR catalyst is in a condition on the border between normal and deteriorated, setting that value of the integrated sensor output difference as a predetermined threshold, and comparing the integrated sensor output difference with the predetermined threshold. Specifically, if the integrated sensor output difference is larger than or equal to the aforementioned predetermined threshold, it may be diagnosed that the SCR catalyst is not deteriorated, and if the integrated sensor output difference is smaller than the aforementioned predetermined threshold, it may be diagnosed that the SCR catalyst is deteriorated.

If the total quantity of hydrogen supplied to the second catalyst casing 5 (or produced in the first catalyst casing 4) over the period through which the above-described induction process is performed (which will be referred to as the "total hydrogen quantity") varies each time the induction process is performed, the integrated sensor output difference also varies accordingly. Then, there is a possibility that deterioration of the SCR catalyst cannot be diagnosed with high accuracy. Therefore, in order to diagnose deterioration of the SCR catalyst with high accuracy, it is preferable that the aforementioned total hydrogen quantity be constant.

The aforementioned total hydrogen quantity depends on the product of the quantity of hydrogen produced per unit fuel and the integrated value of the fuel injection quantity. The quantity of hydrogen produced per unit fuel depends on the quantity of reducing agent produced per unit quantity of fuel. The reducing agent mentioned above is a reducing agent that contributes to the water gas shift reaction in the NSR catalyst (e.g. carbon monoxide).

The reducing agent mentioned above is produced when air-fuel mixture having a rich air-fuel ratio is burned in the internal combustion engine 1. The quantity of reducing agent produced per unit quantity of fuel depends on the air-fuel ratio of the air-fuel mixture (A/F). It should be noted that during the period through which the induction process is performed, the air-fuel ratio of the air-fuel mixture (A/F) is set to a constant air-fuel ratio (i.e. the aforementioned predetermined rich air-fuel ratio). Therefore, during the period through which the induction process is performed, the quantity of reducing agent produced per unit quantity of fuel can be considered to be constant. Therefore, during the period through which the induction process is performed, the quantity of hydrogen produced per unit fuel can be regarded as a constant value. Therefore, during the period through which the induction process is performed, the aforementioned total hydrogen quantity is considered to depend on the integrated value of the fuel injection quantity.

Given the above-described correlations, it is possible to keep the aforementioned total hydrogen quantity constant by terminating the induction process at the time when the integrated value of the fuel injection quantity in the state in which the air-fuel ratio of the air-fuel mixture (A/F) is set to the aforementioned predetermined rich air-fuel ratio reaches a specific quantity. The specific quantity mentioned above is such a quantity that if the integrated value of the fuel injection quantity per unit time in the state in which the air-fuel ratio of the air-fuel mixture is equal to the aforementioned predetermined rich air-fuel ratio reaches this specific quantity, it is estimated that the aforementioned total hydrogen quantity is equal to a desired quantity (which will be hereinafter referred to as "target total hydrogen quantity").

As described above, the water gas shift reaction in the NSR catalyst starts at the time when desorption of the oxygen stored in the NSR catalyst is completed. Therefore, the term "integrated value of the fuel injection quantity" in this specification is defined as the value obtained by integrating the fuel injection quantity from the time at which desorption of the oxygen stored in the NSR catalyst in the first catalyst casing 4 is completed. This value will be hereinafter referred to as the "fuel integration value". In other words, the "fuel integration value" is the integrated value of the fuel injection quantity during the period through which the water gas shift reaction is occurring in the first catalyst casing due to the induction process.

In the case where the NSR catalyst in the first catalyst casing 4 is deteriorated, the water gas shift reaction is less apt to occur than in the case where the NSR catalyst is not deteriorated. FIG. 4 is a timing chart showing the change with time of the air-fuel ratio of the air-fuel mixture (A/F), the fuel integration value, the quantity of hydrogen produced per unit time, and the total hydrogen quantity in a case where the induction process is performed in a state in which the NSR catalyst in the first catalyst casing 4 is deteriorated.

In FIG. 4, as the induction process is started by changing the air-fuel ratio of the air fuel mixture (A/F) from a lean air-fuel ratio to the predetermined rich air-fuel ratio (at t5 in FIG. 4), oxygen stored in the NSR catalyst in the first catalyst casing 4 is desorbed. Consequently, the water gas shift reaction does not occur in the NSR catalyst during the period from the time at which the induction process is started to the time at which desorption of the oxygen stored in the NSR catalyst is completed (i.e. period from t5 to t6 in FIG. 4). Hence, the quantity of hydrogen produced per unit time and the total hydrogen quantity are substantially equal to zero during the period from t5 to t6. After desorption of the oxygen stored in the NSR catalyst is completed (from t6 in FIG. 4), the water gas shift reaction occurs in the NSR catalyst, whereby the quantity of hydrogen produced per unit time starts to increase, and the total hydrogen quantity also starts to increase. At the same time, calculation of the aforementioned fuel integration value ΣFinj is started.

In the case where the NSR catalyst is deteriorated, since the water gas shift reaction is less apt to occur than in the case where the NSR catalyst is not deteriorated, the ratio of the quantity of reducing agent converted into hydrogen in the second catalyst casing 5 to the quantity of reducing agent supplied to the second catalyst casing 5 is lower. In other words, the quantity of hydrogen produced per unit fuel is smaller in the case where the NSR catalyst is deteriorated than in the case where the NSR catalyst is not deteriorated. Therefore, the quantity of hydrogen produced per unit time in the case where the NSR catalyst is deteriorated (represented by the solid line in FIG. 4) is smaller than the quantity of hydrogen produced per unit time in the case where the NSR catalyst is not deteriorated (represented by the chain line in FIG. 4).

In the case where the quantity of hydrogen produced per unit fuel is small due to deterioration of the NSR catalyst, the total hydrogen quantity (represented by the solid line in FIG. 4) at the time when the aforementioned fuel integration value reaches the aforementioned specific quantity (at t7 in FIG. 4) is smaller than the target total hydrogen quantity. Thus, in the case where the total hydrogen quantity is small due to deterioration of the NSR catalyst, the integrated sensor output difference at the time when the aforementioned fuel integration value reaches the aforementioned specific quantity (at t7 in FIG. 4) is also small. In consequence, there is a possibility that the integrated sensor output difference is smaller than the aforementioned predetermined threshold even when the SCR catalyst is not deteriorated.

To address this problem, in this embodiment, the predetermined rich air-fuel ratio during the period through which the induction process is performed is varied taking account of the degree of deterioration of the NSR catalyst, thereby eliminating or reducing the variation of the total hydrogen quantity resulting from deterioration of the NSR catalyst.

If the NOx purification capability of the NSR catalyst is not lost fully, the larger the quantity of reducing agent produced per quantity of unit fuel is, the larger the quantity of hydrogen produced per unit fuel is. The quantity of reducing agent produced per unit quantity of fuel is larger when the air-fuel ratio of the air-fuel mixture is low than when it is high. Therefore, the quantity of hydrogen produced per unit fuel is larger when the air-fuel ratio of the air-fuel mixture is low than when it is high. The quantity of hydrogen produced per unit fuel is larger when the degree of deterioration of the NSR catalyst is low than when it is high. Given the above-described relations, there is a relationship shown in FIG. 5, that is, the quantity of hydrogen produced per unit fuel is smaller when the degree of deterioration of the NSR catalyst is high than when it is low and/or smaller when the air-fuel ratio of the air-fuel mixture is high than when it is low. Therefore, relationship like that shown in FIG. 5 is determined in advance by an experiment, and an air-fuel ratio with which the quantity of hydrogen produced per unit fuel becomes equal to a target value (which is a quantity of hydrogen produced per unit fuel in the case where the NSR catalyst is not deteriorated and will be referred to as the "target production quantity" hereinafter) is calculated using the degree of deterioration of the NSR catalyst as an argument. The air-fuel ratio thus calculated is set as the aforementioned predetermined rich air-fuel ratio.

FIG. 6 shows the change with time of the air-fuel ratio of the air-fuel mixture (A/F), the fuel integration value, the quantity of hydrogen produced per unit time, and the total hydrogen quantity in a case where the induction process is performed with the aforementioned rich air-fuel ratio being set to an air-fuel ratio calculated as above based on the degree of deterioration of the NSR catalyst (which will be hereinafter referred to as the "rich air-fuel ratio for deteriorated state") when the NSR catalyst in the first catalyst casing 4 is deteriorated.

In FIG. 6, when the induction process is started (at t8 in FIG. 6), the air-fuel ratio of the air-fuel mixture (A/F) is set to the aforementioned rich air-fuel ratio for deteriorated state (see the solid line in FIG. 6). When desorption of the oxygen stored in the NSR catalyst in the first catalyst casing 4 is completed (at t9 in FIG. 6), the quantity of hydrogen produced per unit time and the total hydrogen quantity start to increase. The quantity of hydrogen produced per unit time (represented by the solid line in FIG. 6) in this case is larger than the quantity of hydrogen produced per unit time in the case where the predetermined rich air-fuel ratio is set to a rich air-fuel ratio for normal state (i.e. an air-fuel ratio adapted to the state in which the NSR catalyst is not deteriorated) (represented by the two-dot chain line in FIG. 6).

In consequence, in the state in which the NSR catalyst is deteriorated, the total hydrogen quantity at the time when the aforementioned fuel integration value reaches the aforementioned specific quantity (at t10 in FIG. 6) is larger in the case where the predetermined rich air-fuel ratio is set to the rich air-fuel ratio for deteriorated state (represented by the solid line in FIG. 6) than in the case where the predetermined rich air-fuel ratio is set to the rich air-fuel ratio for normal state (represented by the two-dot chain line in FIG. 6). Moreover, as the rich air-fuel ratio for deteriorated state is set to an air-fuel ratio calculated as above based on the degree of deterioration of the NSR catalyst, the total quantity of hydrogen at the time when the fuel integration value reaches the aforementioned specific quantity can be made equal to the aforementioned target total hydrogen quantity.

As described above, since the variation of the total hydrogen quantity due to deterioration of the NSR catalyst is eliminated or reduced by varying the aforementioned rich air-fuel ratio in accordance with the degree of deterioration of the NSR catalyst, the aforementioned integrated sensor output difference is prevented from varying depending on the degree of deterioration of the NSR catalyst. In consequence, deterioration of the SCR catalyst can be diagnosed with improved accuracy.

In the following, the process of diagnosing deterioration of the SCR catalyst in this embodiment will be described with reference to FIG. 7. FIG. 7 is a flow chart of a processing routine executed by the ECU 6 when performing diagnosis of deterioration of the SCR catalyst. The processing routine shown in FIG. 7 is stored in advance in the ROM of the ECU 6 and executed repeatedly by the ECU 6 when the operation state of the internal combustion engine 1 is in the lean operation range.

In the processing routine in FIG. 7, firstly in step S101, the ECU 6 determines whether or not a condition for diagnosis is met. The condition for diagnosis is that the operation state of the internal combustion engine 1 is in the lean operation range, the NSR catalyst in the first catalyst casing 4 and the SCR catalyst in the second casing 5 are active, and the first air-fuel ratio sensor 7 and the second air-fuel ratio sensor 8 are normal. If the induction process is performed when the intake air quantity is relatively small, there is a possibility that the induction process may take a long time. If the induction process is performed when the intake air quantity is relatively large, there is a possibility that a large quantity of hydrogen may slip through the SCR catalyst. To address this problem, a range of intake air quantity that provides an optimal tradeoff between the duration of the induction process and the quantity of hydrogen slipping through the SCR catalyst may be determined in advance, and a condition that the actual intake air quantity (or the measurement value of the air-flow meter 12) falls within that range may be added to the above-described condition for diagnosis. Furthermore, the temperature of the SCR catalyst may change while the induction process is performed. If the quantity of oxidized hydrogen changes greatly due to a change in the temperature of the SCR catalyst, there is a possibility that the integrated sensor output difference may change greatly due to a change in the temperature. To address this problem, a temperature range within which the change in the quantity of oxidized hydrogen relative to the change in the temperature of the SCR catalyst is relatively small may be determined in advance, and a condition that the temperature of the SCR catalyst falls within that temperature range may be added to the above-described condition for diagnosis.

If the determination made in step S101 is negative, the ECU 6 terminates the execution of this processing routine. On the other hand, if the determination made in step S101 is affirmative, the ECU 6 executes the processing of step S102.

In the processing of step S102, the ECU 6 obtains the degree of deterioration of the NSR catalyst in the first catalyst casing 4. The degree of deterioration of the NSR catalyst in the first catalyst casing is determined by another processing routine and stored in the backup RAM or the like of the ECU 6. The degree of deterioration of the NSR catalyst may be determined utilizing the occasion of a rich spike process performed for the purpose of reducing and removing NOx stored in the NOx catalyst or a rich spike process performed for the purpose of supplying ammonia to the SCR catalyst in the second catalyst casing. Specifically, the length of the period from the start of the rich spike process (i.e. the time at which the air-fuel ratio of the exhaust gas flowing into the first catalyst casing 4 changes from a lean air-fuel ratio to a rich air fuel ratio) to the time at which the air-fuel ratio of the exhaust gas flowing out of the first catalyst casing 4 (i.e. the measurement value of the first air-fuel ratio sensor 7) shows a rich air-fuel ratio may be calculated, and the shorter the length of that period is, the higher the degree of deterioration of the NSR catalyst may be determined to be. The aforementioned period will be hereinafter referred to as the "oxygen desorption period". The length of the oxygen desorption period may be the temporal length of the oxygen desorption period. Alternatively, a value correlating with the length of the oxygen desorption period (e.g. the integrated value of the quantity of fuel consumed during the oxygen desorption period or the integrated value of the intake air quantity) may be used as the length of the oxygen desorption period. In that case, the smaller the integrated value of the quantity of fuel consumed during the oxygen desorption period (or the integrated value of the intake air quantity) is, the higher the degree of deterioration of the NSR catalyst may be determined to be. In cases where an air-fuel ratio sensor is provided in the exhaust pipe 3 upstream of the first catalyst casing 4, the integrated value of the difference between the measurement value of that air-fuel ratio sensor and the measurement value of the first air-fuel ratio sensor 7 may be used as a value correlating with the length of the oxygen desorption period. In that case, the smaller the integrated value of the difference between the measurement value of that air-fuel ratio sensor and the measurement values of the first air-fuel ratio sensor 7 over the aforementioned oxygen desorption period is, the higher the degree of deterioration of the NSR catalyst may be determined to be.

In step S103, the ECU 6 determines a predetermined rich air-fuel ratio as a target air-fuel ratio of the air-fuel mixture in the induction process. Specifically, the ECU 6 accesses the map shown in FIG. 5 or a functional expression using the degree of deterioration of the NSR catalyst read in the processing of step S102 as an argument to calculate an air-fuel ratio (or a rich air-fuel ratio for deteriorated state) that makes the quantity of hydrogen per unit fuel equal to the aforementioned target production quantity. Moreover, the ECU 6 sets that rich air-fuel ratio for deteriorated state as the predetermined rich air-fuel ratio.

In step S104, the ECU 6 changes the target air-fuel ratio of the air-fuel mixture to the predetermined rich air-fuel ratio determined in step S103 to start the induction process. Then in step S105, the ECU 6 determines whether or not $O_2$ desorption of the NSR catalyst has been completed. In other words, the ECU 6 determines whether or not the oxygen stored in the NSR catalyst has been desorbed fully. As described above with reference to FIG. 3, during the period from the start of the induction process to the completion of $O_2$ desorption of the NSR catalyst (i.e. the period between t1 and t2 in FIG. 3), the measurement value of the first air-fuel ratio sensor 7 shows the theoretical air-fuel ratio. After the completion of $O_2$ desorption of the NSR catalyst, the measurement value of the first air-fuel ratio sensor 7 changes from the theoretical air-fuel ratio to a rich air-fuel ratio. Therefore, in the processing of step S105, the ECU 6 may determine whether or not the measurement value of the first air-fuel ratio sensor 7 has changed from the theoretical air-fuel ratio to a rich air-fuel ratio.

If the determination made in step S105 is negative, the ECU 6 executes the processing of step S105 repeatedly. If the aforementioned condition for diagnosis ceases to be met due to, for example, deviation of the operation state of the internal combustion engine 1 from the lean operation range during the repeated execution of the processing of step S105, the ECU 6 terminates the execution of this processing routine. If the determination made in step S105 is affirmative, the processing of the ECU 6 proceeds to step S106. In step S106, the ECU 6 starts calculation of the fuel integration value $\Sigma Finj$.

In step S107, the ECU 6 reads the measurement value Raf1 of the first air-fuel ratio sensor 7 and the measurement value Raf2 of the second air-fuel ratio sensor 8. Then in step S108, the ECU 6 calculates the sensor output difference $\Delta A/F$ by subtracting the measurement value Raf1 of the first air-fuel ratio sensor 7 from the measurement value Raf2 of the second air-fuel ratio sensor 8 read in step S107.

In step S109, the ECU 6 calculates the integrated value $\Sigma \Delta A/F$ of the sensor output difference $\Delta A/F$ (integrated sensor output difference) over the period from the completion of $O_2$ desorption of the NSR catalyst to the present time. Specifically, the ECU 6 calculates the integrated sensor output difference $\Sigma \Delta A/F$ over the period from the completion of $O_2$ desorption of the NSR catalyst to the present time by adding the sensor output difference $\Delta A/F$ calculated in the present execution of the processing of step S108 to the integrated value $\Sigma \Delta AA/Fold$ of the sensor output difference $\Delta A/F$ over the period from the completion of $O_2$ desorption of the NSR catalyst to the last execution of the processing of step S109.

In step S110, the ECU 6 determines whether or not the aforementioned fuel integration value $\Sigma Finj$ is larger than or equal to a specific quantity Cinj. The specific quantity Cinj mentioned above is such a quantity that when the fuel integration value $\Sigma Finj$ becomes equal to that specific quantity Cinj, the aforementioned total hydrogen quantity is expected to become equal to the aforementioned target total hydrogen quantity, as descried above. If the determination made in step S110 is negative, the ECU 6 returns to step S107 to continue the induction process. If the aforementioned condition for diagnosis ceases to be met during the induction process, the ECU 6 resets the fuel integration value $\Sigma Finj$ and the integrated sensor output difference $\Sigma \Delta AA/F$ and terminates the execution of this processing routine. On the other hand, if the determination made in step S110 is affirmative, the processing of the ECU 6 proceeds to step S111 to terminate the induction process. In other words, the ECU 6 changes the target air-fuel ratio of the air-fuel mixture from the aforementioned predetermined rich air-fuel ratio back to an air-fuel ratio adapted to the operation condition of the internal combustion engine 1.

After the processing of S111, the processing of the ECU 6 proceeds to step S112, where the ECU 6 determines whether or not the integrated sensor output difference ΣΔA/F calculated in step S109 is equal to or larger than a predetermined threshold Threa/f. The predetermined threshold mentioned Threa/f is a value below which it may be concluded that the NOx purification capability of the SCR catalyst is deteriorated. The value of the predetermined threshold Threa/f is determined in advance by an adaptation process based on an experiment.

If the determination made in step S112 is affirmative (ΣΔA/F≥Threa/f), the processing of the ECU 6 proceeds to step S113, where the ECU 6 determines that the SCR catalyst is not deteriorated, namely it is determined that the SCR catalyst is normal. On the other hand, if the determination made in step S112 is negative (ΣΔA/F<Threa/f), the processing of the ECU 6 proceeds to step S114, where the ECU 6 determines that the SCR catalyst is deteriorated. In that case, the ECU 6 may prompt the driver to have the second catalyst casing 5 fixed, by warning lamp or display provided in the cabin of the vehicle. After the processing of step S113 or S114, the processing of the ECU 6 proceeds to step S115. In step S115, the ECU 6 resets the fuel integration value ΣFinj and the integrated sensor output difference ΣA/F to zero. The controller according to the present invention is embodied by the execution of the processing routine shown in FIG. 7 by the ECU 6.

By performing diagnosis of deterioration of the SCR catalyst in the above-described manner, the total hydrogen quantity can be made equal to the target total hydrogen quantity even when the NSR catalyst is deteriorated. In other words, the total hydrogen quantity can be prevented from varying due to deterioration of the NSR catalyst. In consequence, the variation of the integrated sensor output difference due to deterioration of the NSR catalyst is eliminated or reduced. Therefore, whether the SCR catalyst is deteriorated or not can be diagnosed with high accuracy even when the NSR catalyst is deteriorated.

In the processing routine shown in FIG. 7, diagnosis of deterioration of the SCR catalyst is performed based on the integrated sensor output difference over the period from the completion of $O_2$ desorption of the NSR catalyst to the end of the induction process. Alternatively, diagnosis of deterioration of the SCR catalyst may be performed based on the integrated sensor output difference over the period from the start of the induction process to the end of the induction process. During the period from the start of the induction process to the completion of $O_2$ desorption of the NSR catalyst, a water gas shift reaction in the NSR catalyst does not occur, and desorption of oxygen from the SCR catalyst scarcely occurs. In consequence, the measurement value of the first air-fuel ratio sensor 7 and the measurement value of the second air-fuel ratio sensor 8 are substantially equal to each other in that period. Therefore, the integrated sensor output difference over the period from the start of the induction process to the end of the induction process is substantially equal to the integrated sensor output difference over the period from the completion of $O_2$ desorption of the NSR catalyst to the end of the induction process. Therefore, even in the case where diagnosis of deterioration of the SCR catalyst is performed based on the integrated sensor output difference over the period from the start of the induction process to the end of the induction process, deterioration of the SCR catalyst can be diagnosed with high accuracy.

In this embodiment, there has been described a case where the aforementioned predetermined rich air-fuel ratio is changed taking account of the degree of deterioration of the NSR catalyst, when the NSR catalyst is deteriorated. Alternatively, the aforementioned specific quantity may be changed instead of changing the predetermined rich air-fuel ratio. Specifically, the aforementioned specific quantity may be made larger when the degree of deterioration of the NSR catalyst is high than when it is low. More specifically, the ECU 6 may set the predetermined rich air-fuel ratio during the period through which the induction process is performed to an air-fuel ratio substantially equal to the aforementioned rich air-fuel ratio for normal state and change the specific quantity referred to when determining the time to terminate the induction process taking account of the degree of deterioration of the NSR catalyst. In that case, the ECU 6 calculates the quantity of hydrogen produced per unit fuel in the case where the air-fuel ratio of the air-fuel mixture is substantially equal to the aforementioned rich air-fuel ratio for normal state and the NSR catalyst is deteriorated. Subsequently, the ECU 6 calculates the specific quantity by dividing the aforementioned target production quantity by the quantity of hydrogen produced per unit fuel. The specific quantity thus calculated is larger when the degree of deterioration of the NSR catalyst is high than when it is low.

FIG. 8 shows the change with time of the air-fuel ratio of the air-fuel mixture (A/F), the fuel integration value, the quantity of hydrogen produced per unit time, and the total hydrogen quantity in a case where the induction process is performed in the state in which the aforementioned predetermined rich air-fuel ratio is set to an air-fuel ratio substantially equal to the rich air-fuel ratio for normal state and the aforementioned specific quantity is set to a quantity adapted to the degree of deterioration of the NSR catalyst when the NSR catalyst in the first catalyst casing 4 is deteriorated.

In FIG. 8, the aforementioned specific quantity is larger in the case where the NSR catalyst is deteriorated (Cinj1 in FIG. 8) than in the case where the NSR catalyst is not deteriorated (Cinj0 in FIG. 8). Consequently, the time of the end of the induction process is later in the case where the NSR catalyst is deteriorated (t4' in FIG. 8) than in the case where the NSR catalyst is not deteriorated (t4 in FIG. 8). Accordingly, the fuel integration value at the time of the end of the induction process is larger in the case where the NSR catalyst is deteriorated than in the case where the NSR catalyst is not deteriorated. Thus, the total hydrogen quantity in the case where the NSR catalyst is deteriorated becomes substantially equal to the total hydrogen quantity in the case where the NSR catalyst is not deteriorated (i.e. the target total hydrogen quantity). Therefore, this method is as effective as the method in which the predetermined rich air-fuel ratio is changed taking account of the degree of deterioration of the NSR catalyst.

<Second Embodiment>

A second embodiment of the present invention will be described with reference to FIGS. 9 to 12. In the following, features of the second embodiment difference from the first embodiment will be described, and like features will not be described. The second embodiment differs from the first embodiment in that the induction process is performed taking account of the degree of deterioration of a three-way catalyst provided upstream of an NSR catalyst in addition of the degree of deterioration of the NSR catalyst.

FIG. 9 is a diagram showing the general configuration of the exhaust system of an internal combustion engine 1 according to the second embodiment. In FIG. 9, components same as those in the above-described first embodiment are denoted by the same reference signs. As shown in FIG. 9, the exhaust pipe 3 is provided with an upstream casing 13 upstream of the first catalyst casing 4. The upstream casing 13 houses a three-way catalyst composed of a honeycomb structure coated with a coating layer such as alumina, a noble metal (such as platinum Pt or palladium Pd) supported on the coating layer, and a promotor such as ceria ($CeO_2$) supported on the coating layer. In this embodiment, the upstream casing 13 and the first catalyst casing 4 constitute the first exhaust gas purification device according to the present invention. The exhaust pipe 3 between the upstream casing 13 and the first catalyst casing 4 is provided with a third air-fuel ratio sensor 14, which outputs an electrical signal relating to the air-fuel ratio of the exhaust gas flowing out of the upstream casing 13. The signal output from the third air-fuel ratio sensor 14 is input to the ECU 6.

In this arrangement, when the induction process is performed, a water gas shift reaction occurs not only in the NSR catalyst in the first catalyst casing 4 but also in the three-way catalyst in the upstream casing 13. Therefore, the total quantity of hydrogen supplied to the second catalyst casing 5 over the period through which the induction process is performed (i.e. the total hydrogen quantity) may vary depending not only on the degree of deterioration of the NSR catalyst in the first catalyst casing 4 but also on the degree of deterioration of the three-way catalyst in the upstream casing 13.

To address this problem, in this embodiment, when at least one of the NSR catalyst and the three-way catalyst is deteriorated, the predetermined rich air-fuel ratio is varied in accordance with the degree of deterioration of the deteriorated catalyst(s), thereby reducing or eliminating the variation of the total hydrogen quantity due to deterioration of the NSR catalyst and/or the three-way catalyst. In the following, a method of determining the aforementioned predetermined rich air-fuel ratio will be described.

To determine the aforementioned rich air-fuel ratio, it is necessary to know or prepare relationship between the degree of deterioration of the three-way catalyst, the air-fuel ratio of the air-fuel mixture, and the quantity of hydrogen produced per unit fuel in advance in addition to relationship between the degree of deterioration of the NSR catalyst, the air-fuel ratio of the air-fuel mixture, and the quantity of hydrogen produced per unit fuel (i.e. the relationship shown in FIG. 5). As shown in FIG. 10, the quantity of hydrogen produced per unit fuel in the three-way catalyst is smaller when the degree of deterioration of the three-way catalyst is high than when it is low, and/or when the air-fuel ratio of the air-fuel mixture is high than when it is low. In this embodiment, in addition to the relationship shown in FIG. 5, the relationship shown in FIG. 10 is also prepared in advance.

Then, the ECU 6 determines relationship between the air-fuel ratio of the air-fuel mixture (A/F) and the quantity of hydrogen produced per unit fuel in the NSR catalyst in the case where the degree of deterioration of the NSR catalyst is at a level that is determined separately (see the chain line in FIG. 11) based on the relationship shown in FIG. 5. Furthermore, the ECU 6 determines relationship between the air-fuel ratio of the air-fuel mixture (A/F) and the quantity of hydrogen produced per unit fuel in the three-way catalyst in the case where the degree of deterioration of the three-way catalyst is at a level that is determined separately (see the two-dot chain line in FIG. 11) based on the relationship shown in FIG. 10. Then, the ECU 6 determines relationship between the sum total quantity of hydrogen produced per unit fuel in the NSR catalyst and the three-way catalyst and the air-fuel ratio of the air-fuel mixture (see the solid line in FIG. 11) based on the relationships represented by the chain line and the two-dot chain line in FIG. 11. The ECU 6 calculates an air-fuel ratio at which the sum total quantity of hydrogen produced in the NSR catalyst and the three-way catalyst will become equal to the target production quantity on the basis of the relationship represented by the solid line in FIG. 11 and sets the air-fuel ratio thus calculated as the predetermined rich air-fuel ratio. The target production quantity mentioned above is a quantity equal to the sum total quantity of hydrogen produced per unit fuel in the NSR catalyst and the three-way catalyst in the case where neither the NSR catalyst nor the three-way catalyst are deteriorated.

As described above, by determining the aforementioned predetermined rich air-fuel ratio taking account of the degree of deterioration of the NSR catalyst and the degree of deterioration of the three-way catalyst, the variation of the total hydrogen quantity due to deterioration of the NSR catalyst and/or the three-way catalyst is eliminated or reduced. In consequence, the variation of the aforementioned integrated sensor output difference depending on the degree of deterioration of the NSR catalyst is eliminated or reduced. Therefore, deterioration of the SCR catalyst can be diagnosed with improved accuracy.

In the following, a process of diagnosing deterioration of the SCR catalyst in this embodiment will be described with reference to FIG. 12. FIG. 12 is a flow chart of a processing routine executed by the ECU 6 when performing diagnosis of deterioration of the SCR catalyst. In FIG. 12, the processing steps same as those in the above-described processing routine shown in FIG. 7 are denoted by the same reference signs.

In the processing routine shown in FIG. 12, if the determination made in step S101 is affirmative, the ECU 6 executes the processing of step S201. In step S201, the ECU 6 obtains the degree of deterioration of the NSR catalyst in the first catalyst casing 4 and the degree of deterioration of the three-way catalyst in the upstream casing 13. The degree of deterioration of the NSR catalyst and the degree of deterioration of the three-way catalyst are determined by another processing routine and stored in the backup RAM or the like of the ECU 6. The degree of deterioration of the three-way catalyst in the upstream casing 13 may be determined utilizing the occasion of a rich spike process performed for the purpose of reducing and removing NOx stored in the NOx catalyst or a rich spike process performed for the purpose of supplying ammonia to the SCR catalyst in the second catalyst casing 5. Specifically, the length of the period from the start of the rich spike process (i.e. the time at which the air-fuel ratio of the exhaust gas flowing into the upstream casing 13 changes from a lean air-fuel ratio to a rich air fuel ratio) to the time at which the air-fuel ratio of the exhaust gas flowing out of the upstream catalyst casing 13 (i.e. the measurement value of the third air-fuel ratio sensor 14) shows a rich air-fuel ratio may be calculated, and the shorter the length of that period is, the higher the degree of deterioration of the three-way catalyst may be determined to be. The aforementioned period will be hereinafter referred to as the "first oxygen desorption period". Alternatively, the integrated value of the quantity of fuel consumed during the aforementioned first oxygen desorption period (or the integrated value of the intake air quantity) may be calculated, and the smaller the integrated value thus calculated is, the higher the degree of deterioration of the three-way catalyst may be determined to be. In cases where an air-fuel ratio sensor is provided in the exhaust pipe 3 upstream of the upstream catalyst casing 13, the difference between the measurement value of that air-fuel ratio sensor and the measurement value of the third air-fuel ratio sensor 14 may be integrated over the first oxygen desorption period, and the smaller the integrated value of the difference is, the higher the degree of deterioration of the three-way catalyst may be determined to be. The degree of deterioration of the NSR catalyst in the first catalyst casing 4 may be determined utilizing the occasion of a rich spike process performed for the above-described purposes. Specifically, the length of the period from the time at which desorption of the oxygen stored in the three-way catalyst is completed (i.e. the time at which the measurement value of the third air-fuel ratio sensor 14 changes from the theoretical air-fuel ratio to a rich air-fuel ratio) to the time at which the air-fuel ratio of the exhaust gas flowing out of the first catalyst casing 4 (i.e. the measurement value of the first air-fuel ratio sensor 7) shows a rich spike may be calculated, and the shorter the length of that period is, the higher the degree of deterioration of the NSR catalyst may be determined to be. The aforementioned period will be hereinafter referred to as the "second oxygen desorption period". Alternatively, the integrated value of the quantity of fuel consumed during the aforementioned second oxygen desorption period (or the integrated value of the intake air quantity) may be calculated, and the smaller the integrated value thus calculated is, the higher the degree of deterioration of the NSR catalyst may be determined to be. Alternatively, the difference between the measurement value of the third air-fuel ratio sensor 14 and the measurement value of the first air-fuel ratio sensor 7 may be integrated over the second oxygen desorption period, and the smaller the integrated value of the difference is, the higher the degree of deterioration of the NSR catalyst may be determined to be.

After executing the processing of step S201, the ECU 6 executes the processing of step S202. In Step S202, the ECU 6 determines a predetermined rich air-fuel ratio as a target air-fuel ratio of the air-fuel mixture in the induction process. Specifically, the ECU 6 determines relationship like that represented by the solid line in FIG. 11 on the basis of the degree of deterioration of the three-way catalyst and the degree of deterioration of the NSR catalyst read in the processing of step S201 and the above-described relationships shown in FIGS. 5 and 10. Then, the ECU 6 calculates an air-fuel ratio that makes the sum total quantity of hydrogen produced per unit fuel in the NSR catalyst and the three-ray catalyst equal to the target production quantity based on the relation represented by the solid line in FIG. 11, and sets that air-fuel ratio as the predetermined rich air-fuel ratio.

After executing the processing of step S202, the ECU 6 executes the processing of step S203. In step S203, the ECU 6 starts the induction process by changing the target air-fuel ratio of the air-fuel mixture to the predetermined rich air-fuel ratio determined in step S202.

After executing the processing of step S203, the ECU 6 executes the processing of step S204. In step S204, the ECU 6 determines whether or not $O_2$ desorption of the NSR catalyst has been completed. In other words, the ECU 6 determines whether or not the oxygen stored in the NSR catalyst has been desorbed fully. At the time immediately after the start of the induction process, oxygen is desorbed from the three-way catalyst in the upstream casing 13, and therefore the actual air-fuel ratio of the exhaust gas flowing out of the upstream casing 13 is equal to the theoretical air-fuel ratio. While the actual air-fuel ratio of the exhaust gas flowing out of the upstream housing 13 is equal to the theoretical air-fuel ratio, oxygen is not desorbed from the NSR catalyst in the first catalyst casing 4, and therefore, the actual air-fuel ratio of the exhaust gas flowing out of the first catalyst casing 4 is also equal to the theoretical air-fuel ratio. Moreover, during the period in which oxygen is desorbed from the three-way catalyst, a water gas shift reaction does not occur in the three-way catalyst or the NSR catalyst, and therefore the measurement value of the first air-fuel ratio sensor 7 shows the theoretical air-fuel ratio. After the oxygen stored in the three-way catalyst has been desorbed fully, the actual air-fuel ratio of the exhaust gas flowing out of the upstream casing 13 changes from the theoretical air-fuel ratio to a rich air fuel ratio, and consequently oxygen start to be desorbed from the NSR catalyst in the first catalyst casing 4. While oxygen is thus being desorbed from the NSR catalyst, the actual air-fuel ratio of the exhaust gas flowing out of the first catalyst casing 4 is equal to the theoretical air-fuel ratio. After the oxygen stored in the three-way catalyst has been desorbed fully, a water gas shift reaction occurs in the three-way catalyst, and hydrogen produced in the reaction is consumed in the NSR catalyst in the first catalyst casing 4. Therefore, while oxygen is being desorbed from the NSR catalyst, the measurement value of the first air-fuel ratio sensor 7 shows the theoretical air-fuel ratio. After the oxygen stored in the NSR catalyst has been desorbed fully, the actual air-fuel ratio of the exhaust gas flowing out of the first catalyst casing 4 changes from the theoretical air fuel ratio to the predetermined rich air-fuel ratio. Then, since the NSR catalyst is in a rich atmosphere, hydrogen produced in the upstream casing 13 ceases to be consumed in the NSR catalyst, and a water gas shift reaction is brought about in the NSR catalyst also as well as in the three-way catalyst. Thus, hydrogen produced in the upstream casing 13 and the first catalyst casing 4 flows into the first air-fuel ratio sensor 7. Consequently, the measurement value of the first air-fuel ratio sensor 7 decreases from the theoretical air-fuel ratio to an air-fuel ratio lower than the predetermined rich air-fuel ratio. Therefore, when the measurement value of the first air-fuel ratio sensor 7 decreases from the theoretical air-fuel ratio to an air-fuel ratio lower than the predetermined rich air-fuel ratio, it may be concluded that $O_2$ desorption of the NSR catalyst is completed.

If the determination made in step S204 is negative, the ECU 6 executes the processing of step S204 repeatedly. On the other hand, if the determination made in step S204 is affirmative, the ECU 6 executes the processing of step S106 and the subsequent steps. The processing of step S106 and the subsequent steps is the same as that in the above-described processing routine shown in FIG. 7.

By performing diagnosis of deterioration of the SCR catalyst in the above-described manner, the total hydrogen quantity can be made equal to the target total hydrogen quantity even when at least one of the three-way catalyst and the NSR catalyst is deteriorated. Consequently, the quantity of hydrogen supplied to the second catalyst casing 5 can be prevented from varying due to deterioration of the three-way catalyst and/or the NSR catalyst during the period in which the induction process is being performed. Therefore, whether the SCR catalyst is deteriorated or not can be diagnosed with high accuracy even when the three-way catalyst and/or the NSR catalyst is deteriorated.

In the processing routine shown in FIG. 12, diagnosis of deterioration of the SCR catalyst is performed based on the integrated sensor output difference over the period from the completion of $O_2$ desorption of the NSR catalyst to the end of the induction process. Alternatively, diagnosis of deterioration of the SCR catalyst may be performed based on the integrated sensor output difference over the period from the start of the induction process to the end of the induction process.

In this embodiment, there has been described a case where the aforementioned predetermined rich air-fuel ratio is changed taking account of the degree of deterioration of the three-way catalyst and the degree of deterioration of the NSR catalyst. Alternatively, the aforementioned specific quantity may be changed instead of changing the predetermined rich air-fuel ratio. Specifically, the ECU 6 may set the predetermined rich air-fuel ratio during the execution of the induction process to the aforementioned rich air-fuel ratio for normal state and change the specific quantity referred to when determining the time to terminate the induction process taking account of the degree of deterioration of the three-way catalyst and the degree of deterioration of the NSR catalyst. In that case, the ECU 6 calculates the quantity of hydrogen produced per unit fuel in the case where the air-fuel ratio of the air-fuel mixture is equal to the aforementioned rich air-fuel ratio for normal state and the NSR catalyst and/or the thee-way catalyst is deteriorated. Subsequently, the ECU 6 calculates the specific quantity by dividing the aforementioned target production quantity by the quantity of hydrogen produced per unit fuel. If the induction process is performed with the specific quantity thus calculated, the total hydrogen quantity in the case where the three-way catalyst and/or the NSR catalyst is deteriorated can be made equal to the target total hydrogen quantity or the total hydrogen quantity in the case where neither the three-way catalyst nor the NSR catalyst is deteriorated. Therefore, this method is as effective as the method in which the predetermined rich air-fuel ratio is changed taking account of the degree of deterioration of the three-way catalyst and the degree of deterioration of the NSR catalyst.

<Third Embodiment>

A third embodiment of the present invention will be described with reference to FIG. 13. In the following, features of the third embodiment difference from the above-described second embodiment will be described, and like features will not be described. The third embodiment differs from the second embodiment in that the degree of deterioration of the three-way catalyst and the NSR catalyst is obtained immediately before the induction process is performed.

To eliminate or reduce the variation of the total hydrogen quantity due to deterioration of the three-way catalyst and/or the NSR catalyst with improved reliability, it is preferable that the aforementioned predetermined rich air-fuel ratio be determined taking account of the degree of deterioration of the three-way catalyst and the NSR catalyst at the time at which the induction process is started.

In this embodiment, when the condition for performing diagnosis of deterioration of the SCR catalyst is met, a process ($O_2$ desorption process) of fully desorbing the oxygen stored in the three-way catalyst in the upstream casing 13 and the NSR catalyst in the first catalyst casing 4 is performed to obtain the degree of deterioration of the thee-way catalyst and the degree of deterioration of the NSR catalyst. The $O_2$ desorption process mentioned above is a process of desorbing the oxygen stored in the three-way catalyst and the NSR catalyst quickly by making the air-fuel ratio of the air-fuel mixture equal to an air-fuel ratio (which will be hereinafter referred to as "air-fuel ratio for desorption") lower than the predetermined rich air-fuel ratio during the induction process. When the $O_2$ desorption process is performed, the ECU 6 calculates the integrated value of the fuel injection quantity or the intake air quantity over the period from the start of the $O_2$ desorption process to the time at which the measurement value of the third air-fuel ratio sensor 14 shows a rich air-fuel ratio (i.e. the period through which oxygen is desorbed from the three-way catalyst) and determines the degree of deterioration of the three-way catalyst on the basis of the integrated value thus calculated. Moreover, the ECU 6 calculates the integrated value of the fuel injection quantity or the intake air quantity over the period from the time at which the measurement value of the third air-fuel ratio sensor 14 shows a rich air-fuel ratio to the time at which the measurement value of the first air-fuel ratio sensor 7 shows a rich air-fuel ratio (i.e. the period through which oxygen is desorbed from the NSR catalyst) and determines the degree of deterioration of the NSR catalyst on the basis of the integrated value thus calculated. At the time when the measurement value of the first air-fuel ratio sensor 7 shows a rich air-fuel ratio, the ECU 6 terminates the $O_2$ desorption process by changing the air-fuel ratio of the air-fuel mixture from the aforementioned air-fuel ratio for desorption to the predetermined rich air-fuel ratio and starts the induction process. The predetermined rich air-fuel ratio in this case is determined based on the degree of deterioration of the three-cay catalyst and the degree of deterioration of the NSR catalyst in the same manner as in the above-described embodiment.

As above, since the degree of deterioration of the three-way catalyst and the degree of deterioration of the NSR catalyst are obtained immediately before the induction process is started, it is possible to determine the predetermined rich air-fuel ratio taking account of the degree of deterioration of the three-way catalyst and the degree of deterioration of the NSR catalyst at the time when the induction process is started. Therefore, the variation of the total hydrogen quantity due to deterioration of the three-way catalyst and/or the NSR catalyst can be eliminated or reduced with improved reliability.

In the following, a process of diagnosing deterioration of the SCR catalyst in this embodiment will be described with reference to FIG. 13. FIG. 13 is a flow chart of a processing routine executed by the ECU 6 when performing diagnosis of deterioration of the SCR catalyst. In FIG. 13, the processing steps same as those in the above-described processing routine shown in FIG. 12 are denoted by the same reference signs.

In the processing routine shown in FIG. 13, the ECU 6 firstly executes the processing of step S301. In step S301, the ECU 6 determines whether or not a condition for diagnosis is met. The condition for diagnosis includes a condition that the length of time up to present over which the air-fuel ratio of the air-fuel mixture has been set to be lean continuously (which will be referred to as the lean operation time) is equal to or longer than a specific time in addition to the condition described before in the description of the processing in step S101 in the processing routine shown in FIG. 12. The specific time mentioned above is such a time that when the three-way catalyst and the NSR catalyst are assumed to be normal, if the lean operation time continues for that specific time or longer, it is considered that the oxygen storage capacity of the three-way catalyst and the NSR catalyst will saturate. Thus, when the condition that the lean operation time is equal to or longer than the aforementioned specific time is met, it can be concluded that the oxygen storage capacity of the three-way catalyst and the NSR catalyst is saturated.

If the determination made in step S301 is negative, the ECU 6 terminates the execution of this processing routine.

On the other hand, if the determination made in step S301 is affirmative, the ECU 6 executes the processing of step S302. In step S302, the ECU 6 starts the $O_2$ desorption process by changing the target air-fuel ratio of the air-fuel mixture from lean air-fuel ratio to the air-fuel ratio for desorption.

After executing the processing of step S302, the ECU 6 executes the processing of step S303. In step S303, the ECU 6 determines whether or not $O_2$ desorption of the three-way catalyst in the upstream casing 13 has been completed. Specifically, the ECU 6 determines whether or not the measurement value of the third air-fuel ratio sensor 14 has been changed from the theoretical air-fuel ratio to a rich air-fuel ratio. If the determination made in step S303 is negative, the ECU 6 executes the processing of step S303 repeatedly. If the determination made in step S303 is affirmative, the processing of the ECU 6 proceeds to step S304.

In step S304, the ECU 6 obtains the degree of deterioration of the three-way catalyst. Specifically, the ECU 6 calculates the length of the period from the time of the start of the $O_2$ desorption process to the time at which the measurement value of the second air-fuel ratio sensor 14 shows a rich air-fuel ratio and the integrated value of the fuel injection quantity over that period or the integrated value of the intake air quantity over that period, and the smaller the integrated value thus calculated is, the larger the degree of deterioration of the three-way catalyst is determined to be.

After executing the processing of step S304, the processing of the ECH 6 proceeds to step S305. In step S305, the ECU 6 determines whether or not $O_2$ desorption of the NSR catalyst in the first catalyst casing 4 has been completed. Specifically, the ECU 6 determines whether or not the measurement value of the first air-fuel ratio sensor 7 has changed from the theoretical air-fuel ratio to a rich air-fuel ratio. If the determination made in step S305 is negative, the ECU 6 executes the processing of step S305 repeatedly. If the determination made in step S305 is affirmative, the processing of the ECU 6 proceeds to step S306.

In step S306, the ECU 6 obtains the degree of deterioration of the NSR catalyst. Specifically, the ECU 6 calculates the length of the period from the time of completion of $O_2$ desorption of the three-way catalyst (i.e. the time at which the measurement value of the third air-fuel ratio sensor 14 changes from the theoretical air-fuel ratio to a rich air-fuel ratio) to the time at which the measurement value of the first air-fuel ratio sensor 7 shows a rich air-fuel ratio and the integrated value of the fuel injection quantity over that period or the integrated value of the intake air quantity over that period, and the smaller the integrated value thus calculated is, the larger the degree of deterioration of the three-way catalyst is determined to be. It is not necessary to execute the processing of obtaining the degree of deterioration of the three-way catalyst at the time when $O_2$ desorption of the three-way catalyst is completed, but it may be executed at the time when $O_2$ desorption of the NSR catalyst is completed.

After the processing of step S306, the processing of the ECU 6 proceeds to step S307, where the ECU 6 determines the predetermined rich air-fuel ratio for performing the induction process. The method of determining the predetermined rich air-fuel ratio is the same as the method described in the description of the second embodiment (i.e. the processing of step S202 in the processing routine shown in FIG. 12). After step S307, the processing of the ECU 6 proceeds to step S308, where the ECU 6 starts the induction process. Specifically, the ECU 6 changes the air-fuel ratio of the air-fuel mixture from the aforementioned air-fuel ratio for desorption to the aforementioned predetermined rich air-fuel ratio. Since $O_2$ desorption of the three-way catalyst and the NSR catalyst has already been completed at that time, a water gas shift reaction occurs in the first catalyst casing 4 and the second catalyst casing 5 immediately. Therefore, the processing of the ECU 6 proceeds to step S106, where the ECU 6 starts calculation of the fuel integration value $\Sigma Finj$. The processing of step S106 and the subsequent steps is the same as that in the above-described second embodiment.

By the above-described process, the aforementioned predetermined rich air-fuel ratio can be determined taking account of the degree of deterioration of the three-way catalyst and the degree of deterioration of the NSR catalyst at the time when the induction process is started. In consequence, the variation of the total hydrogen quantity due to deterioration of the NSR catalyst can be eliminated or reduced with improved reliability. Therefore, deterioration of the SCR catalyst can be diagnosed with improved accuracy.

<Other Embodiments>

In the second and third embodiments, there have been described cases where the degree of deterioration of the three-way catalyst and the degree of deterioration of the NSR catalyst are obtained separately. Alternatively, the three-way catalyst and the NSR catalyst may be regarded as one catalyst, and the degree of deterioration of these catalysts as a whole may be obtained. The degree of deterioration of the three-way catalyst and the NSR catalyst regarded as a whole may be obtained based on the length of the period from the time of the start of a rich spike process performed for the purpose of reducing and removing NOx stored in the NSR catalyst, the start of a rich spike process performed for the purpose of supplying ammonia to the SCR catalyst in the second catalyst casing, or the start of the $O_2$ desorption process to the time at which the measurement value of the first air-fuel ratio sensor 7 shows a rich air-fuel ratio and the integrated value of the fuel injection quantity or the intake air quantity over that period, and the aforementioned predetermined rich air-fuel ratio may be determined based on the degree of deterioration thus obtained. When this method is employed, while the variation of the total hydrogen quantity may be a little larger than in the case where the degree of deterioration of the three-way catalyst and the degree of deterioration of the NSR catalyst are obtained separately, the variation of the integrated sensor output difference may be made smaller than in the case where the induction process is performed without taking account of the degree of deterioration of the three-way catalyst or the NSR catalyst. Obtaining the degree of deterioration of the three-way catalyst and the NSR catalyst regarded as a whole enables simplification of control logic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-135615, filed on Jul. 6, 2015, which is hereby incorporated by reference herein in its entirety.

The invention claimed is:

1. A deterioration diagnosis apparatus for use in an exhaust gas purification apparatus which comprises:
a first exhaust gas purification device provided in an exhaust passage of an internal combustion engine capable of operating in a lean-burn mode, the first exhaust gas purification device comprising a hydrogen production catalyst that promotes a water gas shift reaction using a reducing agent produced by combustion of an air-fuel mixture when the air-fuel ratio of the air-fuel mixture is equal to a predetermined rich air-fuel ratio that is lower than a theoretical air-fuel ratio; and a second exhaust gas purification device provided in the exhaust passage downstream of said first exhaust gas purification device, the second exhaust gas purification device comprising a selective catalytic reduction catalyst that stores oxygen in exhaust gas when the air-fuel ratio of the exhaust gas is a lean air-fuel ratio higher than the theoretical air fuel ratio, and desorbs oxygen stored therein when the air-fuel ratio of the exhaust gas is lower than the theoretical air-fuel ratio, a first air-fuel ratio sensor that measures a physical quantity correlating with the air-fuel ratio of the exhaust gas flowing into said second exhaust gas purification device, and a second air-fuel ratio sensor that measures a physical quantity correlating with the air-fuel ratio of the exhaust gas flowing out of said second exhaust gas purification device, the deterioration diagnosis apparatus comprising:

a controller comprising at least one processor, said controller is configured to receive signals from said first air-fuel ratio sensor, and said second air-fuel ratio sensor;

said controller is configured to control first exhaust gas purification device and said second exhaust gas purification device;

said controller is configured to start an induction process, which is a process of inducing a water gas shift reaction in said first exhaust gas purification device, when the air-fuel ratio of the air-fuel mixture is a lean air-fuel ratio by controlling the operation state of the internal combustion engine in such a way as to change the air-fuel ratio of the air-fuel mixture to said predetermined rich-air fuel ratio;

said controller is configured to terminate said induction process when an integrated value of quantity of injected fuel over a period through which the water gas shift reaction is brought about in said first exhaust gas purification device by said induction process reaches a specific quantity;

said controller is configured to integrate a sensor output difference defined as a difference between the measurement value of said first air-fuel ratio sensor and the measurement value of said second air-fuel ratio sensor over the period through which said induction process is performed to obtain an integrated sensor output difference defined as the sum total of the sensor output difference over the period through which said induction process is performed;

said controller is configured to diagnose deterioration of said second exhaust gas purification device using the integrated sensor output difference as a parameter;

said controller is configured to obtain the degree of deterioration of said hydrogen production catalyst and control the operation state of the internal combustion engine in such a way as to make the quantity of the reducing agent supplied to said first exhaust gas purification device during the period through which said induction process is performed larger when the degree of deterioration obtained is high than when the degree of deterioration obtained is low.

2. The deterioration diagnosis apparatus for an exhaust gas purification apparatus according to claim 1, wherein said controller makes said predetermined rich air-fuel ratio lower when the degree of deterioration of said hydrogen production catalyst is high than when it is low.

3. The deterioration diagnosis apparatus for an exhaust gas purification apparatus according to claim 1, wherein said controller makes said specific quantity larger when the degree of deterioration of said hydrogen production catalyst is high than when it is low.

4. The deterioration diagnosis apparatus for an exhaust gas purification apparatus according to any one of claims 1, wherein said hydrogen production catalyst has an oxygen storage capability of storing oxygen in the exhaust gas when the air-fuel ratio of the exhaust gas is a lean air-fuel ratio higher than the theoretical air-fuel ratio and desorbing oxygen stored therein when the air-fuel ratio of the exhaust gas is equal to or lower than the theoretical air-fuel ratio, before performing said induction process, said controller performs an $O_2$ desorption process in which the air-fuel ratio of the exhaust gas discharged from the internal combustion engine is changed to an air-fuel ratio for desorption lower than or equal to said predetermined rich air-fuel ratio to desorb oxygen stored in said hydrogen production catalyst and measures the length of a period from the start of said $O_2$ desorption process to the time at which the measurement value of said first air-fuel ratio sensor shows a rich air-fuel ratio, and obtains the degree of deterioration of said hydrogen production catalyst based on the length of that period.

5. The deterioration diagnosis apparatus for an exhaust gas purification apparatus according to any one of claims 2, wherein said hydrogen production catalyst has an oxygen storage capability of storing oxygen in the exhaust gas when the air-fuel ratio of the exhaust gas is a lean air-fuel ratio higher than the theoretical air-fuel ratio and desorbing oxygen stored therein when the air-fuel ratio of the exhaust gas is equal to or lower than the theoretical air-fuel ratio, before performing said induction process, said controller performs an $O_2$ desorption process in which the air-fuel ratio of the exhaust gas discharged from the internal combustion engine is changed to an air-fuel ratio for desorption lower than or equal to said predetermined rich air-fuel ratio to desorb oxygen stored in said hydrogen production catalyst and measures the length of a period from the start of said $O_2$ desorption process to the time at which the measurement value of said first air-fuel ratio sensor shows a rich air-fuel ratio, and obtains the degree of deterioration of said hydrogen production catalyst based on the length of that period.

6. The deterioration diagnosis apparatus for an exhaust gas purification apparatus according to any one of claims 3, wherein said hydrogen production catalyst has an oxygen storage capability of storing oxygen in the exhaust gas when the air-fuel ratio of the exhaust gas is a lean air-fuel ratio higher than the theoretical air-fuel ratio and desorbing oxygen stored therein when the air-fuel ratio of the exhaust gas is equal to or lower than the theoretical air-fuel ratio, before performing said induction process, said controller performs an $O_2$ desorption process in which the air-fuel ratio of the exhaust gas discharged from the internal combustion engine is changed to an air-fuel ratio for desorption lower than or equal to said predetermined rich air-fuel ratio to desorb oxygen stored in said hydrogen production catalyst and measures the length of a period from the start of said $O_2$ desorption process to the time at which the measurement value of said first air-fuel ratio sensor shows a rich air-fuel ratio, and obtains the degree of deterioration of said hydrogen production catalyst based on the length of that period.

7. A deterioration diagnosis apparatus for use in an exhaust gas purification apparatus of an internal combustion engine capable of operating in a lean-burn mode, the internal combustion engine which comprises:
a fuel injection valve configured to supply a fuel into a cylinder of the internal combustion engine; and
an intake throttle valve provided in an intake pipe of the internal combustion engine, the exhaust gas purification apparatus which comprises:
a first exhaust gas purification device provided in an exhaust passage of the internal combustion engine, the first exhaust gas purification device comprising a hydrogen production catalyst promotes a water gas shift reaction using a reducing agent produced by combustion of an air-fuel mixture when the air-fuel ratio of the air-fuel mixture is equal to a predetermined rich air-fuel ratio that is lower than a theoretical air-fuel ratio;
a second exhaust gas purification device provided in the exhaust passage downstream of said first exhaust gas purification device, the second exhaust gas purification device comprising a selective catalytic reduction catalyst that stores oxygen in exhaust gas when the air-fuel ratio of the exhaust gas is a lean air-fuel ratio higher than the theoretical air fuel ratio and desorbs oxygen stored therein when the air-fuel ratio of the exhaust gas is lower than the theoretical air-fuel ratio;
a first air-fuel ratio sensor that measures a physical quantity correlating with the air-fuel ratio of the exhaust gas flowing into said second exhaust gas purification device; and
a second air-fuel ratio sensor that measures a physical quantity correlating with the air-fuel ratio of the exhaust gas flowing out of said second exhaust gas purification device, the deterioration diagnosis apparatus comprising:
a controller comprising at least one processor,
said controller is configured to receive signals from said first air-fuel ratio sensor, and said second air-fuel sensor;
said controller is configured to control said fuel injection valve said intake throttle valve, said first exhaust gas purification device, and said second exhaust gas purification device;
said controller is configured to start an induction process, which is a process of inducing a water gas shift reaction in said first exhaust gas purification device, when the air-fuel ratio of the air-fuel mixture is a lean air-fuel ratio by increasing a target fuel injection quantity of the fuel injection valve and/or decreasing a degree of opening of the intake throttle valve in such a way as to change the air-fuel ratio of the air-fuel mixture to said predetermined rich-air fuel ratio;
said controller is configured to terminate said induction process when the integrated value of the quantity of injected fuel over a period through which the water gas shift reaction is brought about in said first exhaust gas purification device by said induction process reaches a specific quantity;
said controller is configured to integrate a sensor output difference defined as a difference between the measurement value of said first air-fuel ratio sensor and the measurement value of said second air-fuel ratio sensor over the period through which said induction process is performed to obtain an integrated sensor output difference defined as the sum total of the sensor output difference over the period through which said induction process is performed;
said controller is configured to diagnose deterioration of said second exhaust gas purification device using the integrated sensor output difference as a parameter;
said controller is configured to obtain the degree of deterioration of said hydrogen production catalyst and control the fuel injection valve and/or the intake throttle valve in such a way as to make the quantity of the reducing agent supplied to said first exhaust gas purification device during the period through which said induction process is performed larger when the degree of deterioration obtained is high than when the degree of deterioration obtained is low.

* * * * *